(12) United States Patent
Takagi

(10) Patent No.: US 11,523,443 B2
(45) Date of Patent: Dec. 6, 2022

(54) EXTRACTION, CONVERSION, AND TRANSMISSION OF USER PACKET FROM ENCAPSULATED PACKET

(71) Applicant: NEC Corporation, Tokyo (JP)

(72) Inventor: Kazuo Takagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/251,705

(22) PCT Filed: Jun. 12, 2019

(86) PCT No.: PCT/JP2019/023231
§ 371 (c)(1),
(2) Date: Dec. 11, 2020

(87) PCT Pub. No.: WO2019/240158
PCT Pub. Date: Dec. 19, 2019

(65) Prior Publication Data
US 2021/0112607 A1    Apr. 15, 2021

(30) Foreign Application Priority Data
Jun. 13, 2018    (JP) .............................. JP2018-112590

(51) Int. Cl.
*H04W 76/10*    (2018.01)
*H04L 12/46*    (2006.01)
*H04L 45/74*    (2022.01)

(52) U.S. Cl.
CPC ......... *H04W 76/10* (2018.02); *H04L 12/4633* (2013.01); *H04L 45/74* (2013.01)

(58) Field of Classification Search
None
See application file for complete search history.

(56) References Cited

U.S. PATENT DOCUMENTS

| 9,246,872 B2 | 1/2016 | Skog |
| 9,313,049 B2 | 4/2016 | Tamura |
| 9,402,185 B2 | 7/2016 | Chen |
| 9,525,613 B2 | 12/2016 | Akiyoshi |
| 9,596,607 B2 | 3/2017 | Chen et al. |

(Continued)

FOREIGN PATENT DOCUMENTS

| JP | 2012-248956 A | 12/2012 |
| JP | 5587512 B2 | 9/2014 |

(Continued)

OTHER PUBLICATIONS

International Search Report and Written Opinion corresponding to PCT/JP2019/023231, dated Sep. 3, 2019 (8 total pages).

*Primary Examiner* — Christine T Duong

(57) ABSTRACT

A network configuration apparatus configures a closed network constructed independently for each user in an open network as a cloud LAN, generates an access point for accessing the cloud LAN assigned to each of a plurality of terminals that belong to a user using the cloud LAN. A user information management apparatus selects an access point assigned to a connection terminal accessing the cloud LAN via a mobile data transfer network, and notifies the connection terminal of the access point selected. An address management apparatus delivers an address for the connection terminal to access the cloud LAN in response to a request from the connection terminal.

16 Claims, 16 Drawing Sheets

(56) References Cited

U.S. PATENT DOCUMENTS

| | | |
|---|---|---|
| 9,609,519 B2 | 3/2017 | Chen |
| 9,820,155 B2 | 11/2017 | Chen |
| 9,888,387 B2 | 2/2018 | Chen |
| 9,967,738 B2 | 5/2018 | Skog |
| 10,271,362 B2 | 4/2019 | Nakano et al. |
| 10,609,742 B2 | 3/2020 | Nakano et al. |
| 2012/0113989 A1 | 5/2012 | Akiyoshi |
| 2012/0300778 A1 | 11/2012 | Tamura |
| 2013/0238816 A1 | 9/2013 | Skog |
| 2014/0274407 A1* | 9/2014 | Calippe ............... H04L 67/10 463/42 |
| 2014/0334336 A1 | 11/2014 | Chen et al. |
| 2014/0334405 A1 | 11/2014 | Chen |
| 2014/0334406 A1 | 11/2014 | Chen et al. |
| 2014/0334467 A1 | 11/2014 | Chen et al. |
| 2014/0334468 A1 | 11/2014 | Chen |
| 2014/0334469 A1 | 11/2014 | Chen et al. |
| 2014/0334470 A1 | 11/2014 | Chen |
| 2014/0334471 A1 | 11/2014 | Chen |
| 2016/0099917 A1 | 4/2016 | Glazemakers et al. |
| 2016/0157094 A1 | 6/2016 | Skog |
| 2018/0063877 A1 | 3/2018 | Nakano et al. |
| 2018/0159855 A1* | 6/2018 | Ha ................ H04L 63/0884 |
| 2018/0183763 A1 | 6/2018 | Glazemakers et al. |
| 2019/0150210 A1 | 5/2019 | Nakano et al. |
| 2019/0182711 A1 | 6/2019 | Senju et al. |
| 2020/0187278 A1 | 6/2020 | Nakano et al. |

FOREIGN PATENT DOCUMENTS

| | | |
|---|---|---|
| JP | 2016-526319 A | 9/2016 |
| JP | 2018-508140 A | 3/2018 |
| WO | WO-2001/005095 A1 | 1/2001 |
| WO | WO-2011/155484 | 12/2011 |
| WO | WO-2016/139947 | 9/2016 |
| WO | WO-2017/212603 | 12/2017 |

* cited by examiner

FIG. 7

306: MOBILE TERMINAL MANAGEMENT TABLE

| MOBILE TERMINAL | ASSIGNED IP ADDRESS | MOBILE SESSION | IP ADDRESS OF PGW MOBILE |
|---|---|---|---|
| TERMINAL 11-1 | IP_a1000-1 | Session_110-1 | IP_A |
| TERMINAL 11-2 | IP_a1000-2 | Session_110-2 | IP_B |
| TERMINAL 11-3 | IP_a1000-3 | Session_110-3 | IP_C |
| TERMINAL 11-4 | IP_a1000-4 | Session_110-4 | IP_D |
| ... | ... | ... | ... |

FIG. 9

306a: MOBILE TERMINAL MANAGEMENT TABLE

| MOBILE TERMINAL | ASSIGNED IP ADDRESS | MOBILE SESSION | IP ADDRESS OF PGW MOBILE | DIRECT ACCESS |
|---|---|---|---|---|
| TERMINAL 11-1 | IP_a1000-1 | Session_110-1 | IP_A | |
| TERMINAL 11-2 | IP_a1000-2 | Session_110-2 | IP_B | ○ |
| TERMINAL 11-3 | IP_a1000-3 | Session_110-3 | IP_A | |
| TERMINAL 11-4 | IP_a1000-4 | Session_110-4 | IP_B | |
| ... | ... | ... | ... | ... |

EXTRACTION, CONVERSION, AND TRANSMISSION OF USER PACKET FROM ENCAPSULATED PACKET

CROSS-REFERENCE TO RELATED APPLICATIONS

This application is a national stage application of International Application No. PCT/JP2019/023231 entitled "COMMUNICATION SYSTEM AND COMMUNICATION METHOD," filed on Jun. 12, 2019, which claims the benefit of priority of Japanese Patent Application No. 2018-112590, filed on Jun. 13, 2018, the disclosures of each of which are hereby incorporated by reference in their entirety.

FIELD

The present invention relates to a communication system and communication method.

BACKGROUND

Due to expansion of a geographical coverage rate of a mobile network and further increase in an access bandwidth thereof, flourishing of businesses utilizing mobile terminals such as smartphones is observed irrespective of a geographical condition such as in an urban area, or a depopulated area. For instance, when connecting a mobile terminal taken outside office and an in-house LAN, connection therebetween is usually performed via the Internet or a closed network (dedicated line).

Patent Literature (PTL) 1 discloses a closed system that connects a mobile terminal and a LAN utilizing a closed network. FIG. 16 is a diagram illustrating the system disclosed in PTL 1.

Referring to FIG. 16, on reception of a service order from a specific user, a service order reception apparatus 92 instructs to a closed data transfer network configuration apparatus 93 to provide service accommodation. The closed data transfer network configuration apparatus 93 generates a channel for communication between a mobile terminal belonging to the specific user and a LAN in PGWs (Packet Data Network Gateways) 91-1 and 91-2, which are connection gateways between a mobile transfer system 10 and a closed data transfer network 95.

Note that, when a sign of a component is herein denoted as a combination of numbers and a hyphen, the component will be represented by the number on a left side of the hyphen. For instance, when there is no particular reason for distinguishing between PGW 91-1 and PGW 91-2, "PGW 91" is used.

The closed data transfer network configuration apparatus 93 configures a communication channel between the PGW 91 and the LAN 99 owned by a user (customer) in the closed data transfer network 95. The closed data transfer network configuration apparatus 93 registers a PGW 91 accessible to a mobile terminal 11 in a user information management apparatus 94. The closed data transfer network configuration apparatus 93 registers an identifier of the mobile terminal 11 in association with an identifier of the PGW 91 accessible to the mobile terminal 11 in the user information management apparatus 94.

The following describes data packet transfer from the mobile terminal 11 to the LAN 99.

When connecting to a mobile transfer system 10, the mobile terminal 11 sends terminal information (information for identifying the terminal and a location thereof) to the user information management apparatus 94 via a base station 12. Based on the terminal information, the user information management apparatus 94 sends, to the base station 12, a notification of information on the PGW 91 to which the mobile terminal 11 connects. The base station 12 sets the PGW 91 as a transfer destination of a data packet from the mobile terminal 11 based on the notification. A data packet from the mobile terminal 11 is outputted by the base station 12 to a mobile data transfer network 13.

The PGW 91 outputs a data packet received to the communication channel between the PGW 91 and the LAN 99 (the communication channel established in the closed data transfer network 95 by the closed data transfer network configuration apparatus 93). The data packet is delivered to the LAN 99 via the communication channel configured in the closed data transfer network 95. The data packet transfer from the mobile terminal 11 to the LAN 99 is performed as described above.

PTL Japanese Patent No. 5587512

SUMMARY

The disclosure of the above cited literature is incorporated herein in its entirety by reference thereto. The following analysis is given by the present inventors.

The technology disclosed in PTL 1 described above requires a LAN system that receives a packet(s) transmitted by each terminal and forwards the packet(s) to an appropriate destination in order to implement transmission and reception of a packet(s) via the mobile transfer system between terminals belonging to a specific user. However, construction of such a LAN system that performs aggregation and forwarding of a packet(s) (switch operation) is costly and communication between mobile terminals cannot be easily achieved.

It is a main object of the present invention to provide a communication system and communication method that contribute to un-necessitate a LAN system to be prepared by a user in communication between terminals using a mobile data transfer network.

According to a first aspect of the present invention or the present disclosure, there is provided a communication system including a network configuration apparatus that configures a closed network constructed independently for each user in an open network as a cloud LAN (Local Area Network) and generates an access point for accessing the cloud LAN assigned to each of a plurality of terminals that belong to a user using the cloud LAN. The communication system further includes a user information management apparatus that selects the access point assigned to a connection terminal, out of the plurality of terminals, the connection terminal accessing the cloud LAN via a mobile data transfer network, and notifies the connection terminal of the access point selected. The communication system further includes an address management apparatus that delivers an address for the connection terminal to access the cloud LAN in response to a request from the connection terminal.

According to a second aspect of the present invention or the present disclosure, there is provided a communication method including:

configuring, as a cloud LAN (Local Area Network), a closed network constructed independently for each user in an open network, and generating an access point for accessing the cloud LAN assigned to each of a plurality of terminals that belong to a user using the cloud LAN;

selecting the access point assigned to a connection terminal, out of the plurality of terminals, the connection terminal accessing the cloud LAN via a mobile data transfer network and notifying the connection terminal of the selected access point; and delivering an address for the connection terminal to access the cloud LAN in response to a request from the connection terminal.

According to each aspect of the present invention or the present disclosure, there is provided a communication system and communication method that contribute to unnecessitate a LAN system to be prepared by a user in communication between terminals using a mobile data transfer network. That is, the present invention transforms the communication system described in Background to a configuration capable of greatly facilitating construction thereof.

BRIEF DESCRIPTION OF THE DRAWINGS

FIG. 7 is a diagram illustrating an example of a mobile terminal management table according to the second example embodiment.

FIG. 9 is a diagram illustrating an example of a mobile terminal management table according to a third example embodiment.

DETAILED DESCRIPTION

Figure 1:
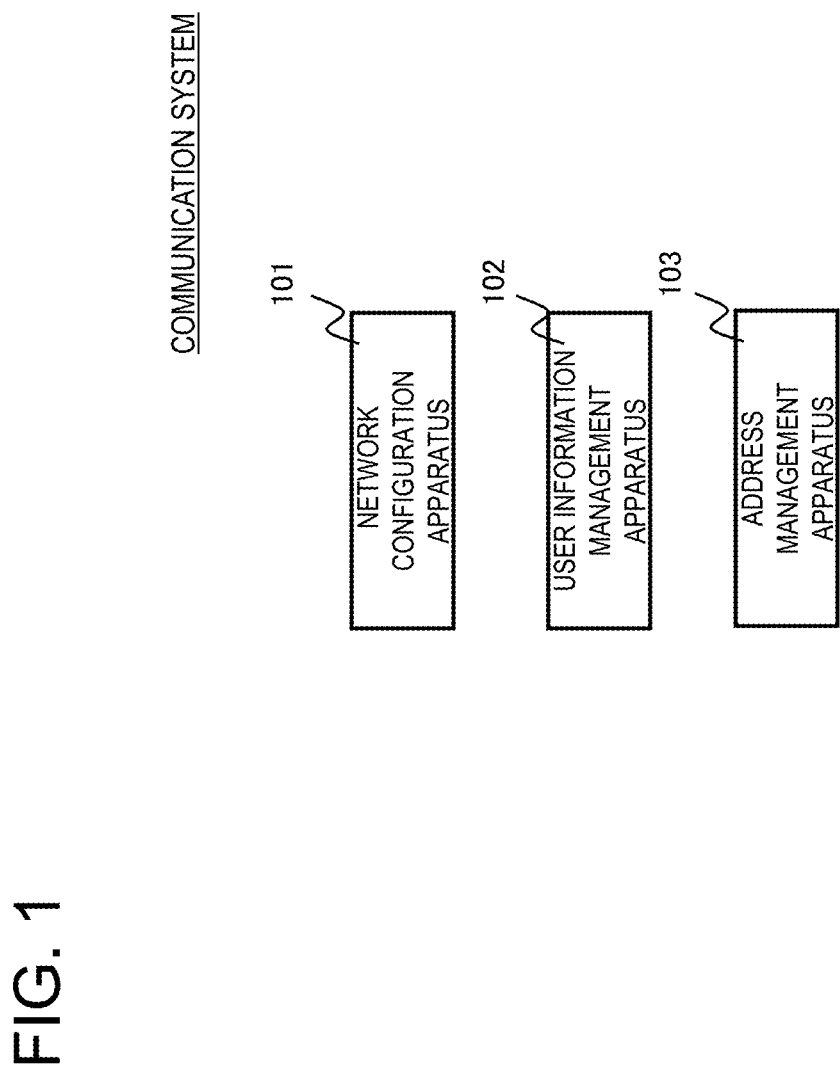
FIG. 1 is a diagram illustrating an outline of an example embodiment.

First, an outline of example embodiments of the present invention will be described. It is noted that drawing reference signs in this outline are given to each element for convenience as an example to facilitate understanding, and description in this outline is not intended to limit the present invention. Connection lines between blocks in the drawings can be both bidirectional and unidirectional. A unidirectional arrow schematically illustrates a main flow of a signal (data) and does not exclude bidirectionality. A program is executed by a computer apparatus. The computer apparatus includes, for instance, a processor, storage apparatus, input apparatus, communication interface, and a display apparatus, as necessary. The computer apparatus may be configured to be able to perform wired or wireless communication with an internal apparatus provided therein or external apparatus (including a computer) via a communication interface. In a circuit diagram, block diagram, internal configuration diagram, and connection diagram illustrated in the present application disclosure, input and output ends of each connection line have an input port and an output port, respectively, although not illustrated explicitly. The same applies to input/output interfaces. In the following description, "A and/or B" means at least one of A and B.

A communication system according to an example embodiment includes a network configuration apparatus 101, a user information management apparatus 102, and an address management apparatus 103 (refer to FIG. 1). The network configuration apparatus 101 configures a closed network constructed independently for each user in an open network as a cloud LAN (Local Area Network). The network configuration apparatus 101 generates an access point for accessing the cloud LAN assigned to each of a plurality of terminals that belong to a user using the cloud LAN. The user information management apparatus 102 selects an access point assigned to a connection terminal out of the plurality of terminals, wherein the connection terminal is a terminal accessing the cloud LAN via a mobile data transfer network. The user information management apparatus 102 notifies the connection terminal of the access point selected. The address management apparatus 103 delivers to the connection terminal an address with which the connection terminal accesses the cloud LAN in response to a request from the connection terminal.

In the above described communication system described above, when communicating with each other via a mobile data transfer network, terminals use a network (cloud LAN) provided on the cloud. The cloud LAN is a closed network configured on an open network independently for each user and packet forwarding on the cloud LAN is performed by using an access point assigned to each terminal. That is, a user is not required to prepare a communication node(s) for realizing packet forwarding on the cloud LAN, and the system (communication system) automatically generates the communication node(s). As a result, communication between terminals using a mobile data transfer network can be implemented with no need for a user to prepare a specific LAN system. The above described communication system realizes a method for configuring a LAN on a mobile network and packet forwarding between terminals.

Specific example embodiments will be described in more detail with reference to the drawings. Note that the same reference signs are given to the same elements in each one of the example embodiments, and the description thereof will be omitted.

First Example Embodiment

A first example embodiment will be described in detail with reference to the drawings.

Figure 2:
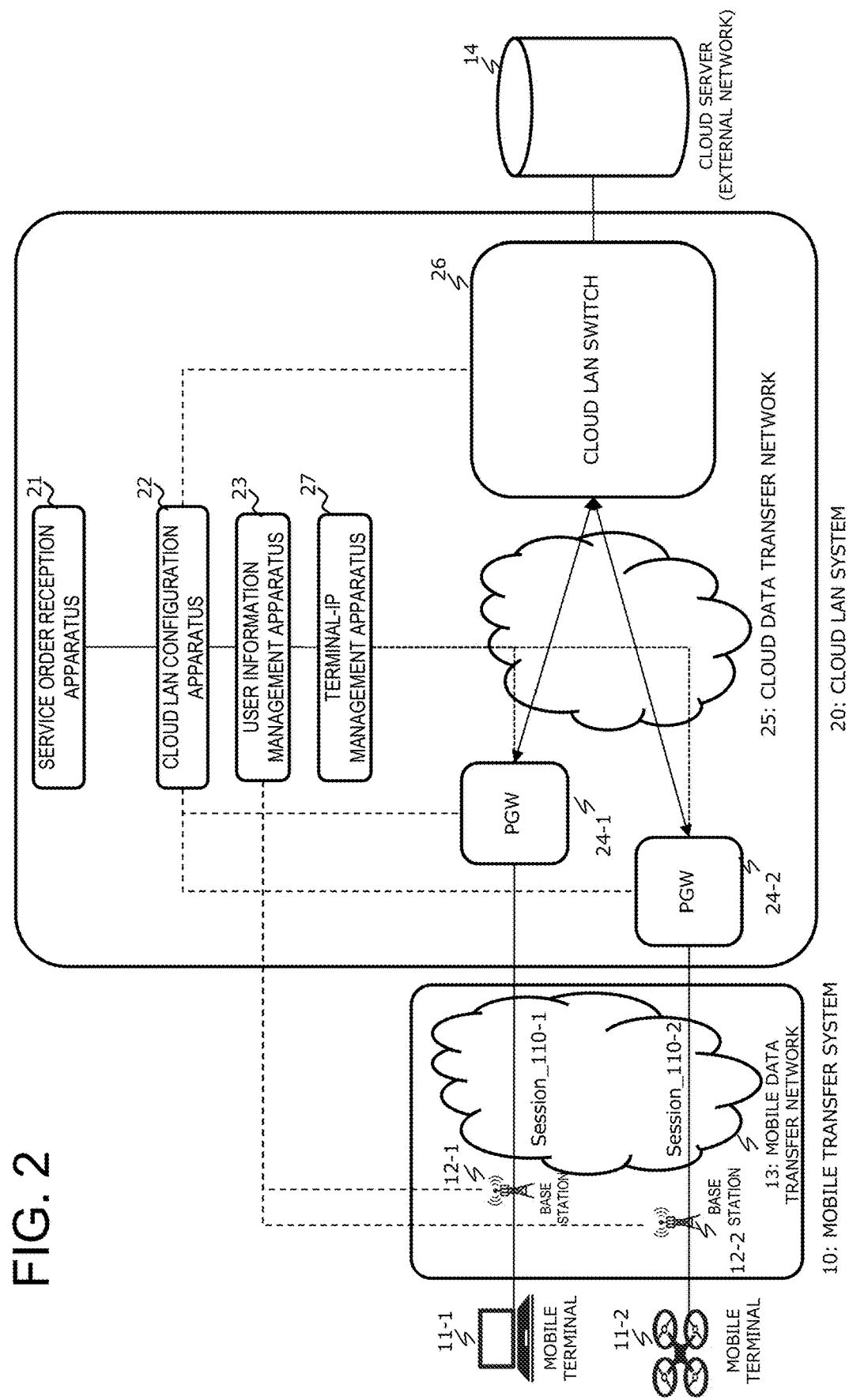
FIG. 2 is a diagram illustrating a schematic configuration example of a cloud LAN system according to a first example embodiment.

FIG. 2 is a diagram illustrating a schematic configuration example of a cloud LAN system 20 according to the first example embodiment. With reference to FIG. 2, the cloud LAN system 20 is configured to include a service order reception apparatus 21, a cloud LAN configuration apparatus 22, and a user information management apparatus 23. The cloud LAN system 20 further includes PGWs 24, a cloud data transfer network 25, a cloud LAN switch 26, and a terminal-IP (Internet Protocol) management apparatus 27.

In the first example embodiment, the cloud LAN system 20 is assumed to be connected to the mobile transfer system 10.

The cloud LAN is a closed network constructed independently for each user on an open network. In a cloud LAN, all or a part of communication nodes required to perform packet transmission and reception between mobile terminals (terminals connecting to a mobile data transfer network) are implemented on a server on the cloud. That is, the cloud LAN is a network in which, when mobile terminals of users are going to communicate with each other using the mobile data transfer network 13, the users are not required to prepare or manage communication nodes required for the communication. These communication nodes are managed by a third party other than the users.

In the example of FIG. 2, the communication between mobile terminals 11-1 and 11-2 is realized by the communication nodes (the PGW 24 and the cloud LAN switch 26) implemented on a server on the cloud. That is, at least the PGW 24 and the cloud LAN switch 26 are communication nodes (logical nodes) implemented on a server on the cloud. Hence, when a packet is to be transmitted to these apparatuses, the server on the cloud receives the packet and the PGW 24 constructed on the server processes the packet. It is noted that the server may be provided for each of the PGWs 24 and the cloud LAN switch 26 or the same server may have the PGWs 24 and the cloud LAN switch 26 implemented thereon.

In FIG. 2, though the network with the server on the cloud arranged is denoted as "cloud data transfer network,", this network is an open network such as the Internet.

The PGW 24 is an apparatus that serves as an access point for the mobile data transfer network 13 and the cloud LAN (the cloud data transfer network 25). More specifically, the PGW 24 is a gateway for the cloud LAN assigned to each of the mobile terminals 11 of users (e.g., enterprises) using the cloud LAN. The PGW 24 terminates an encapsulated IP packet of a tunnel session in each of the cloud data transfer network 25 and the mobile data transfer network 13. The PGW 24 has a function of processing a decapsulated user packet, performing appropriate IP encapsulation, and then forwarding the packet to a tunnel session in a data transfer network (the mobile data transfer network 13 and the cloud data transfer network 25). As described above, the PGW 24 is implemented on the server on the cloud.

The cloud data transfer network 25 provides a function of forwarding the encapsulated IP packets from the PGW 24 and from the cloud LAN switch 26. The cloud data transfer network 25 is configured to include communication nodes such as a router, L3 (layer 3) switch, etc.

The cloud LAN switch 26 is an apparatus that performs switching of a packet that is forwarded on the cloud LAN. That is, the cloud LAN switch 26 performs path control (routing, switch operation) for a packet on the cloud LAN. When receiving a data packet forwarded on the cloud LAN, the cloud LAN switch 26 decapsulates the data packet received to extract a user packet.

The cloud LAN switch 26 provides a function of executing routing control based on a destination in a header of a user packet and appropriately transmitting the user packet according to an attribute of a connection destination (forwarding destination) network. For instance, when a destination of a user packet is a cloud server 14 (or an external network), the cloud LAN switch 26 transmits the user packet without performing encapsulation thereof. On the other hand, when a destination of the user packet is another mobile terminal different from a source, the cloud LAN switch 26 performs encapsulation of the user packet (adapted to the cloud data transfer network 25) for transmission.

The service order reception apparatus 21 receives a request from a user to use the service of the cloud LAN. The service order reception apparatus 21 receives information such as a username (identifier identifying a user), information (terminal identifier) of the mobile terminal 11 accommodated in the cloud LAN, and a requirement specification (capacity requested from the cloud LAN) from the user.

In the following description, information acquired by the service order reception apparatus 21 from the user is referred to as "mobile terminal information." The mobile terminal information includes at least a username of a user using the cloud LAN and an identifier (terminal identifier) of a mobile terminal using the cloud LAN.

On reception of a service order from a user, the service order reception apparatus 21 issues an instruction to construct a cloud LAN for the user on the cloud (in the cloud data transfer network 25) to the cloud LAN configuration apparatus 22. Then, the service order reception apparatus 21 issues an instruction to set up an access point between the LAN constructed and the mobile data transfer network 13 to the cloud LAN configuration apparatus 22.

The service order reception apparatus 21 transmits the mobile terminal information acquired from the user (username, terminal identifier, etc.) to the cloud LAN configuration apparatus 22 along with these instructions.

The cloud LAN configuration apparatus 22 is an apparatus that configures (sets up) a closed network as a cloud LAN constructed independently for each user on an open network. The cloud LAN configuration apparatus 22 generates an access point to be assigned to each of a plurality of mobile terminals 11 belonging respectively to a plurality of users, each using the cloud LAN.

The cloud LAN configuration apparatus 22 secures a cloud LAN resource dedicated to a specific user (allocating the cloud LAN resource to the specific user) in response to the instructions (a cloud LAN configuration instruction and an access point set up instruction) issued from the service order reception apparatus 21. The cloud LAN configuration apparatus 22 allocates a resource(s) (e.g., a communication node(s) and a transfer path(s)) that are included in the cloud LAN system 20 (e.g. to the specific user in order to configure a cloud LAN dedicated to the specific user, according to the instructions.

Generation (or set up) of the PGW 24 for the specific user, generation (or assignment, set up) of the cloud LAN switch 26, and set up of a data transfer path in the cloud data transfer network 25 connecting the PGW 24 and the cloud LAN switch 26 correspond to allocation of the resources. More specifically, the cloud LAN configuration apparatus 22 provides the mobile terminal information to a server on the cloud and instructs the server to generate the PGW 24 and the cloud LAN switch 26 to be assigned to each mobile terminal.

On reception of the instruction, the server generates the PGW 24 and the cloud LAN switch 26 and notifies the cloud LAN configuration apparatus 22 of information including IP addresses assigned respectively to the generated apparatuses (the PGW 24 and the cloud LAN switch 26). More specifically, the server notifies the cloud LAN configuration apparatus 22 of information which associates a mobile terminal 11 with the IP addresses of the PGW 24 and the cloud LAN switch 26 assigned to the mobile terminal 11 as "cloud LAN information." That is, the cloud LAN information includes a terminal identifier of the mobile terminal 11 using the cloud LAN service and network identifiers (IP addresses) of the PGW 24 and the cloud LAN switch 26 assigned to the mobile terminal 11.

The server generates the PGW 24 and the cloud LAN switch 26 using a template or the like prepared in advance by a system administrator.

The cloud LAN configuration apparatus 22 notifies the PGW 24 and the cloud LAN switch 26 of the cloud LAN information acquired. That is, the cloud LAN configuration apparatus 22 notifies the PGW 24 and the cloud LAN switch 26 of information required to implement data transfer between the PGW 24 and the cloud LAN switch 26 (or a data transfer path between the PGWs 24). For instance, it is necessary for the cloud LAN configuration apparatus 22 to notify the IP address of the PGW 24 to the cloud LAN switch 26. As a result, the cloud LAN switch 26 is enabled to grasp the IP address of the PGW 24 and data transfer (transmission and reception of a packet) becomes possible. The PGW 24 is able to distinguish the mobile terminal 11 assigned thereto from the mobile terminal 11 assigned to other apparatus, based on the cloud LAN information. For instance, in the example of FIG. 2, if the mobile terminal 11-1 is assigned to the PGW 24-1, the PGW 24-1 can grasp this fact (assignment) from the mobile terminal information.

The data transfer path described above is in principle a tunnel forwarding path for user data.

The cloud LAN configuration apparatus 22 notifies the user information management apparatus 23 of information such as the username, whether or not an access to the cloud LAN is allowed (an identifier of the mobile terminal utilizing the cloud LAN), a allocated bandwidth, the allowed transmission/reception data capacity, the PGW 24 that is assigned to each mobile terminal, etc. That is, the cloud LAN configuration apparatus 22 notifies the mobile terminal information (the username, the terminal identifier, etc.) and cloud resources allocated to the mobile terminal 11 (the cloud LAN information such as the IP address of the PGW 24, etc.) to the user information management apparatus 23.

The user information management apparatus 23 selects an access point assigned to the mobile terminal (connection terminal), out of the plurality of mobile terminals, accessing the cloud LAN via the mobile data transfer network. Then the user information management apparatus 23 notifies the connection terminal of the selected access point.

The user information management apparatus 23 manages information of the mobile terminal 11, the user, the PGW 24 serving as an access point, and used bandwidth, by using the information provided by the cloud LAN configuration apparatus 22. The user information management apparatus 23 selects a PGW 24 to be connected based on the information transmitted by the mobile terminal 11 when the terminal is connected to the mobile data transfer network 13 (user information such as the terminal identifier, affiliation, location information, etc.). For instance, in the example of FIG. 2, when the cloud LAN information indicates that the PGW 24-1 is assigned to the mobile terminal 11-1 and the mobile terminal 11-1 is connected to the mobile data transfer network 13, the user information management apparatus 23 selects the PGW 24-1.

On reception of a connection request from a mobile terminal 11, the base station 12 in the mobile transfer system 10 is configured to forward the connection request from the mobile terminal 11 to the user information management apparatus 23. Based on the forwarding of the connection request, the user information management apparatus 23 is able to identify the base station 12 connected to the mobile terminal 11 that uses the cloud LAN system 20.

On reception of the connection request from the base station 12, the user information management apparatus 23, based on the terminal identifier of the mobile terminal 11, identifies the PGW 24 serving as an access point for the mobile terminal 11 (selects the PGW 24 from the PGWs 24 generated by the cloud LAN configuration apparatus 22). The user information management apparatus 23 constructs a tunnel session between the PGW 24 identified and the mobile terminal 11. More specifically, the user information management apparatus 23 sets information needed to construct the tunnel session in the base station 12 and the PGW 24.

For instance, the user information management apparatus 23 transmits, to an apparatus that terminates the tunnel session (e.g., the PGW 24), address information of a destination apparatus of an encapsulated packet (the other termination apparatus; e.g., the base station 12) and a session name. The user information management apparatus 23 performs alive monitoring on the mobile terminal 11 with the tunnel session constructed. When being unable to detect the mobile terminal 11 in the alive monitoring, the user information management apparatus 23 releases the tunnel session.

When setting up/releasing a tunnel session, the user information management apparatus 23 notifies the terminal-IP management apparatus 27 of the mobile terminal information (a username, and a terminal identifier), the cloud LAN information (an IP addresses of the PGW 24, etc.), and information on the tunnel constructed. In the following description, information on a constructed tunnel is denoted as "session information." The session information includes a session name set up or disclosed and an identifier (IP address) of a termination apparatus.

The user information management apparatus 23 transmits "mobile terminal added information" including session information set to the mobile terminal 11 to the terminal-IP management apparatus 27, when the mobile terminal 11 is a terminal that can access a cloud LAN. The user information management apparatus 23 transmits "mobile terminal release information" including the session information of the tunnel session released to the terminal-IP management apparatus 27, when a session related to the mobile terminal 11 is released.

The terminal-IP management apparatus 27 delivers (dispenses) an address with which the mobile terminal 11 accesses the cloud LAN in response to a request from the mobile terminal 11. More specifically, the terminal-IP management apparatus 27 determines an IP address (an IP address for accessing the cloud LAN) to be assigned to the mobile terminal 11 based on information (the mobile terminal addition information) acquired from the user information management apparatus 23. On reception of the request for an IP address from the mobile terminal 11, the terminal-IP management apparatus 27 delivers an IP address using specific information specific to the mobile terminal 11 (a terminal identifier) in response to the request.

The terminal-IP management apparatus 27 notifies the PGW 24 and the cloud LAN switch 26 of information including the IP address assigned to the mobile terminal 11.

The configuration of the cloud LAN system 20 according to the first example embodiment is as described above.

Next, an operation of the cloud LAN system 20 according to the first example embodiment will be described. The following describes an operation in which a user A newly subscribes to the cloud LAN service and the mobile terminal 11 is accommodated in the cloud LAN service.

Figure 3:
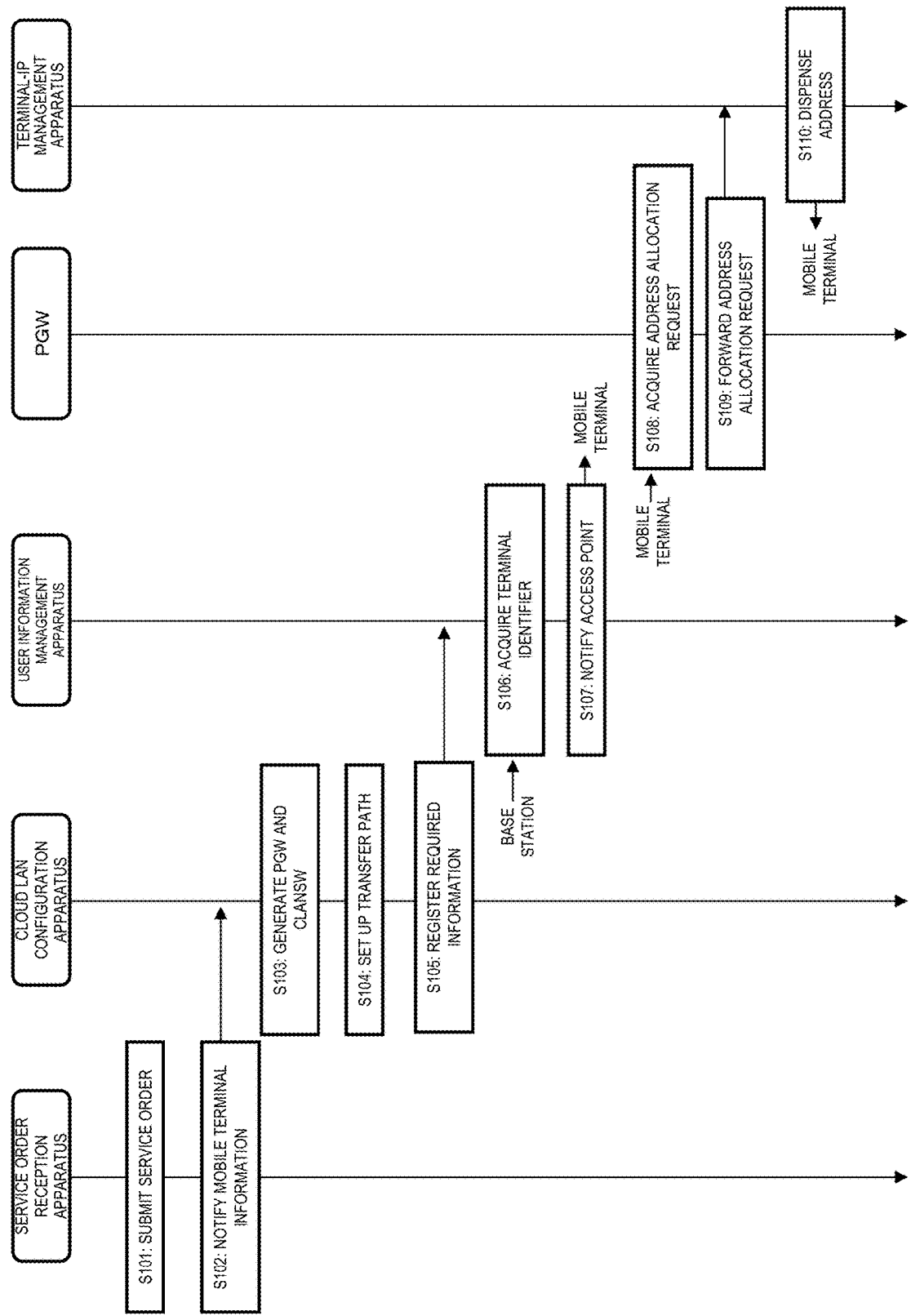
FIG. 3 is a sequence diagram for explaining an operation of the cloud LAN system according to the first example embodiment.

The operation of the cloud LAN system will be described with reference to a sequence diagram illustrated in FIG. 3.

The user A subscribes to the cloud LAN service via the service order reception apparatus 21. That is, the service order reception apparatus 21 receives a service order from the user A (step S101). When subscribing to the cloud LAN service, the user A enters at least specific information specific to the mobile terminal 11 (a terminal identifier) to the service order reception apparatus 21.

The service order reception apparatus 21 notifies the cloud LAN configuration apparatus 22 of the mobile terminal information including the username, the unique information (terminal identifier) of the mobile terminal 11, bandwidth information, and an allowable amount of transmission/reception data (step S102).

On reception of the mobile terminal information, the cloud LAN configuration apparatus 22 generates the PGW 24 and the cloud LAN switch 26 for the user A (step S103). That is, the cloud LAN configuration apparatus 22 issues an instruction to generate the PGW 24 and the cloud LAN switch (CLANSW) 26 for a specific user to the server on the cloud. Due to the instruction, a resource (cloud LAN resource) on the server is secured.

The cloud LAN configuration apparatus 22 sets up a path that connects the two apparatuses generated (the PGW 24 and the cloud LAN switch 26) (step S104).

The cloud LAN configuration apparatus 22 registers required information in the user information management apparatus 23 (step S105). More specifically, a username (e.g., a company name) for the information specific to the mobile terminal 11, accessibility to the cloud LAN, an identifier of the PGW 24 serving as an access point, an allocated bandwidth, an allowed transmission/reception data amount, etc. are registered. That is, the cloud LAN configuration apparatus 22 notifies the mobile terminal information and the cloud LAN information to the user information management apparatus 23.

The cloud LAN is generated for the user A in the cloud LAN system 20 with the operation described above.

When the mobile terminal 11 that has been registered in the cloud LAN service connects to the mobile transfer system 10, the terminal identifier of the mobile terminal 11 is forwarded from the base station 12 to the user information management apparatus 23 via a control signal.

The user information management apparatus 23 acquires the unique information (terminal identifier) of the mobile terminal 11 from the base station 12 (step S106). From the unique information of the mobile terminal 11, the user information management apparatus 23 obtains information such as a username, the PGW 24 serving as an access point, and an allocated bandwidth. From these items of information, the user information management apparatus 23 grasps the access point (the PGW 24) assigned to the user A and that the mobile terminal 11 belongs to the user A.

Then, the user information management apparatus 23 notifies the mobile terminal 11 or the base station 12 of the PGW 24 serving as the access point when the mobile terminal 11 uses the cloud LAN system 20 (step S107).

On reception of this notification directly or via the base station 12, the mobile terminal 11 transmits, to the base station 12, a data packet for performing terminal address allocation request. The base station 12 transmits the data packet to the PGW 24 which is notified to the base station 12 as the access point. The data packet is forwarded from the base station 12 to the PGW 24 via the mobile data transfer network 13. As a result, the PGW 24 acquires the address allocation request from the mobile terminal 11 (step S108).

The PGW 24 analyzes the data packet and forwards the data packet to the terminal-IP management apparatus 27 (step S109).

The terminal-IP management apparatus 27 delivers a terminal address to the mobile terminal 11, following the address allocation request (step S110).

Based on the deliver address delivered, the mobile terminal 11 is able to transmit/receive a data packet(s) in the cloud LAN system 20 thereafter. The user information management apparatus 23 constructs a tunnel in the mobile data transfer network 13, for instance, after the step S106.

As described, the user information management apparatus 23 acquires the information specific to a connection terminal via the mobile data transfer network 13 and selects an access point (PGW 24) to be assigned to the connection terminal, based on the specific information acquired. Then the user information management apparatus 23 notifies the connection terminal of the access point selected via the base station 12 connecting to the connection terminal. The connection terminal (the mobile terminal 11) is able to communicate with a communication node in the cloud LAN via the access point.

Figure 4:
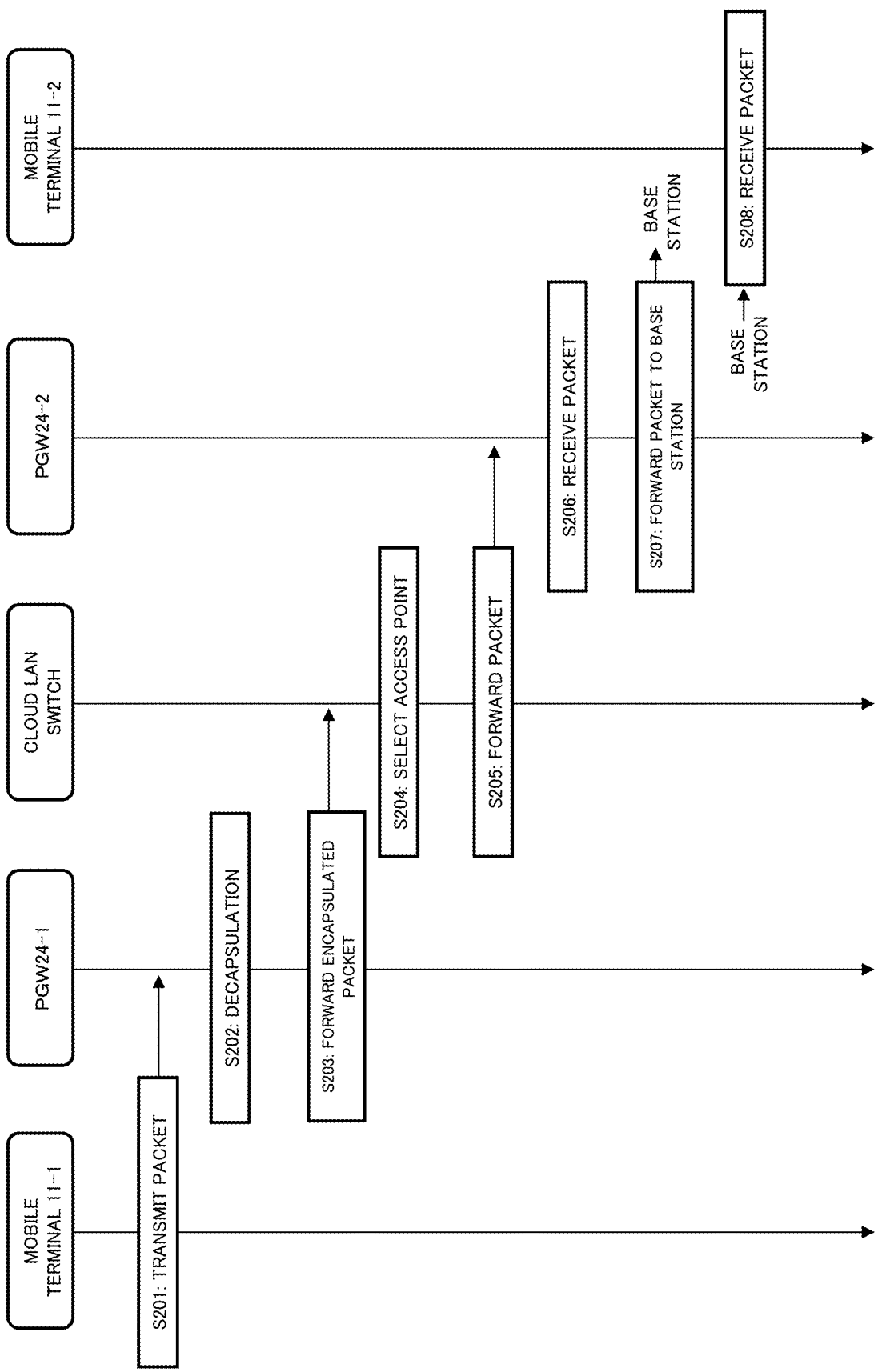
FIG. 4 is a sequence diagram for illustrating communication between mobile terminals using the cloud LAN system according to the first example embodiment.

With reference to FIG. 4, the following describes an example in which the mobile terminal 11-1 and the mobile terminal 11-2, both belonging to the user A, communicate with each other using the cloud LAN system 20. In this example, it is assumed that terminal addresses A and B are assigned to the mobile terminals 11-1 and 11-2, respectively.

It is also assumed that the PGWs 24-1 and 24-2 are assigned to the mobile terminals 11-1 and 11-2, respectively, as respective access points.

When communicating with the mobile terminal 11-2, the mobile terminal 11-1 transmits a user data packet with a source terminal address set to A and a destination terminal address set to B (step S201).

The user data packet is encapsulated by the base station 12 and forwarded to the PGW 24-1 via the mobile data transfer network 13.

The PGW 24-1 decapsulates the user data packet received to extract the user data packet (step S202).

The PGW 24-1 encapsulates the extracted user data packet for the cloud data transfer network 25 and forwards the user data packet to the cloud LAN switch 26 (step S203).

The cloud LAN switch 26 decapsulates the user data packet received, refers to the destination IP address B, and determines an access point to which the packet is to be outputted (step S204). Here, the PGW 24-2 is selected as the output destination of the decapsulated packet.

The cloud LAN switch 26 encapsulates the decapsulated packet (the extracted user data packet) for the cloud data transfer network 25 and forwards the encapsulated packet to the cloud data transfer network 25 (step S205).

The encapsulated packet is forwarded to the PGW 24-2 by a communication node (router, and/or switch) on the cloud data transfer network 25 (the PGW 24-2 receives the encapsulated packet; step S206).

The PGW 24-2 decapsulates the received packet (the encapsulated packet). At this time, the PGW 24-2 obtains the destination IP address B of the user data packet. The PGW 24-2 encapsulates the user data packet for the mobile data transfer network 13 and forwards the encapsulated packet to the base station 12-2 which is a connection destination of the mobile terminal 11-2 (step S207).

The base station 12-2 decapsulates the encapsulated packet to extract the user data packet which then arrives at the mobile terminal 11-2 (the mobile terminal 11-2 receives the packet; step S208).

As described above, the PGW 24 receives an encapsulated packet from either the mobile data transfer network 13 or the cloud data transfer network 25 and extracts a user packet from the encapsulated packet received. Then the PGW 24 converts the user packet extracted into an encapsulated packet adapted to the other network (either the mobile data transfer network 13 or the cloud data transfer network 25) for transmission. The cloud LAN switch 26 similarly receives an encapsulated packet from either the mobile data transfer network 13 or the cloud data transfer network 25 and extracts a user packet from the encapsulated packet received. Then the cloud LAN switch 26 converts the user packet extracted into an encapsulated packet adapted to the other network for transmission. Thus, it is possible to construct a cloud LAN to perform data transfer and exchange.

As described above, in the cloud LAN system according to the first example embodiment, a cloud LAN is constructed on an open network in response to a request from a user. When a mobile terminal 11 is going to access the cloud LAN via the mobile data transfer network 13, the mobile terminal 11 is notified of the access point (the PGW 24) assigned to the mobile terminal 11. As a result, the following effects can be obtained.

Figure 16:
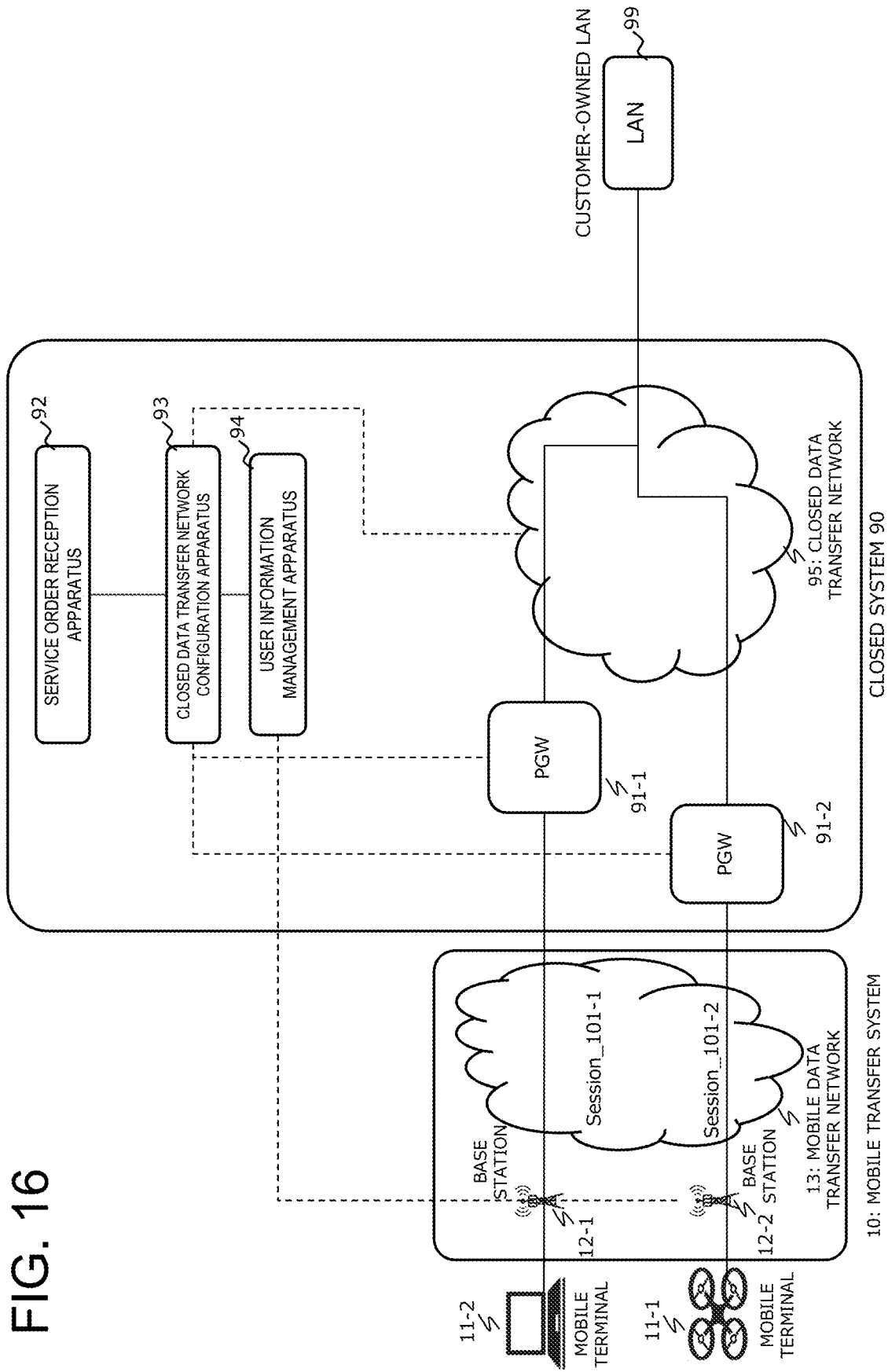
FIG. 16 is a diagram illustrating a system disclosed in Patent Literature 1.

A first effect is that there is no need for a user to prepare a LAN system. This is because a user-specific LAN (an independent LAN dedicated to the user) can be constructed on a service providing cloud LAN system. Since the user does not need a LAN system, it is as a matter of course, unnecessary to be concerned with a far-sighted data transmission/reception amount of the LAN. This is in contrast to the technology disclosed in Patent Literature 1 in which an increase in a load on the LAN system owned by the user becomes a problem. For instance, when the mobile terminal 11-1 transmits packet data to the mobile terminal 11-2 in FIG. 16, the packet data is accommodated by the LAN 99 and the packet is transmitted to an appropriate forwarding destination within the LAN 99. That is, user packets of the mobile terminal 11 are temporarily aggregated in the user's LAN 99 and switching operation of the packets is performed within the LAN 99. As a result, the load on the LAN 99 increases. In the cloud LAN system of the first example embodiment, a user-owned LAN (system) is not present and there is no need for a user to be concerned with (care for) an increase in the load of the LAN.

A second effect is that high-quality communication with small delay can be achieved between the mobile terminals 11. For instance, when a user terminal tries to access a regionally distributed LAN that is not directly connected to the cloud data transfer network, connection is made through a data transfer network again to the desired LAN, thus decreasing a network utilization efficiency. Such a connection method adversely affects a delay-sensitive service and may be a deal breaker for services that require a real-time performance. In contrast, in the first example embodiment, since connection does not go through a LAN of a user, it is unlikely that the problem described above will occur.

Second Example Embodiment

Next, a second example embodiment will be described in detail with reference to the drawings.

Figure 5:
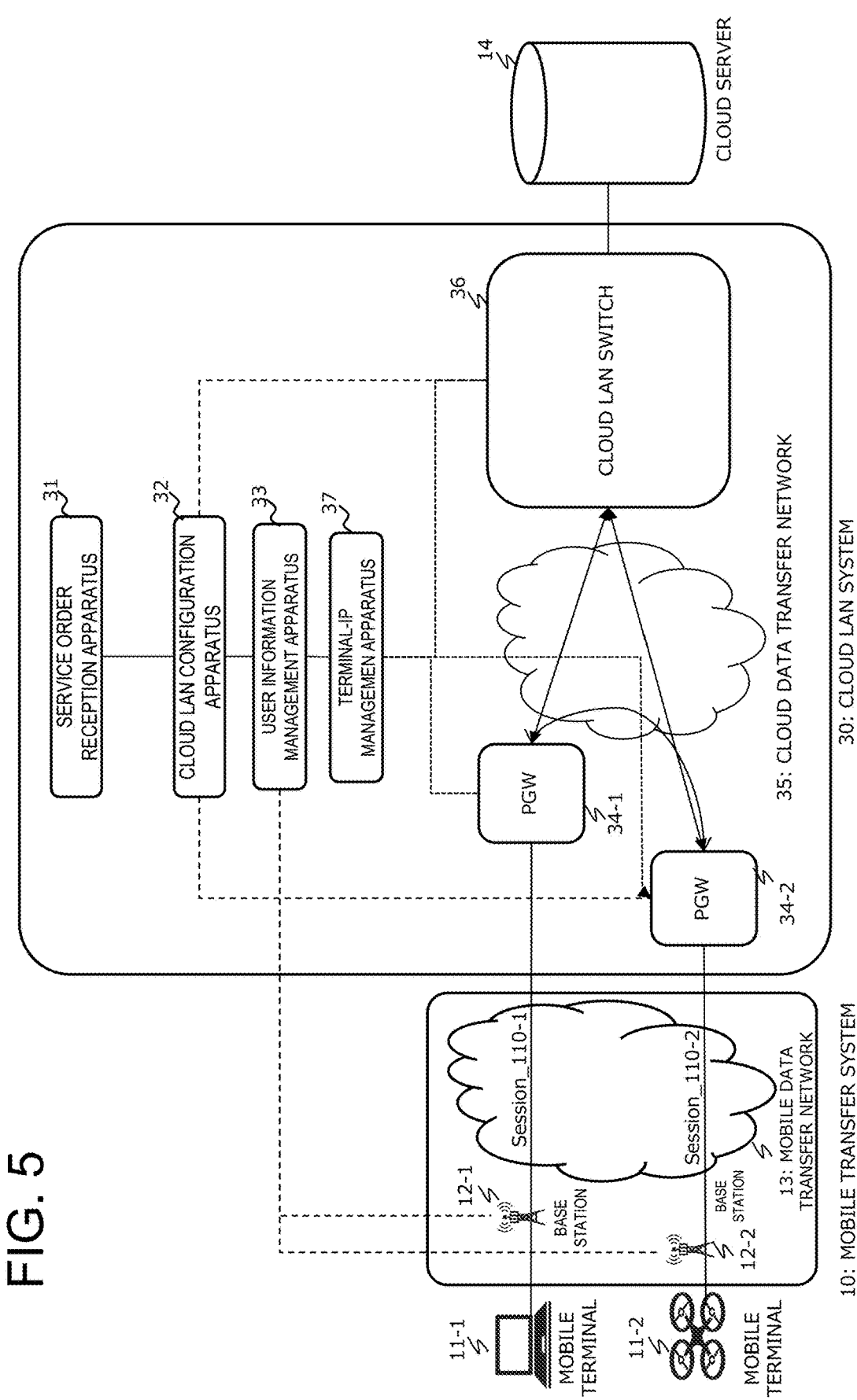
FIG. 5 is a diagram illustrating a schematic configuration example of a cloud LAN system according to a second example embodiment.

In the second example embodiment, the cloud LAN system described in the first example embodiment will be explained more specifically. FIG. 5 is a diagram illustrating a schematic configuration example of a cloud LAN system 30 according to the second example embodiment. In the description of an operation of the cloud LAN system 30, it is assumed that the cloud LAN system 30 is connected to the mobile transfer system 10 in FIG. 5.

A configuration of the cloud LAN system 30 will be described with reference to FIG. 5. The cloud LAN system 30 is configured to include a service order reception apparatus 31, a cloud LAN configuration apparatus 32, a user information management apparatus 33, PGWs 34, a cloud data transfer network 35, a cloud LAN switch 36, and a terminal-IP management apparatus 37.

The service order reception apparatus 31 manages generation and deletion of a cloud LAN. The service order reception apparatus 31 receives an order relating to a cloud LAN service from a user (e.g., an organization such as an enterprise) and notifies the cloud LAN configuration apparatus 32 of the request.

The service order reception apparatus 31 notifies, to the cloud LAN configuration apparatus 32, a username (an identifier of the user) providing a cloud LAN service and an identifier (terminal identifier) of a mobile terminal that is owned by the user, and uses the cloud LAN service.

The cloud LAN configuration apparatus 32 has a function of allocating (securing) a cloud LAN resource(s) dedicated to a specific user in response to a service order request (acquisition of mobile terminal information) from the service order reception apparatus 31. Specifically, the cloud LAN resources are PGW 34 and cloud LAN switch 36 that enables users to exchange a data packet(s) between the PGWs 34 or with an external network (or a cloud server 14). A tunnel session for forwarding a user packet between the PGWs 34 corresponds to the cloud LAN resource(s).

A tunnel session is used to make an address system of a data transfer network (e.g., the cloud data transfer network 35) which is heterogeneous from a user's address system independent. It is noted that if such an independent address system can be employed, a tunnel session, as a matter of course, is unnecessary. In the second example embodiment, the tunnel described above is assumed to be an IP tunnel. It is noted that with the same reason as stated above, a tunnel is also constructed within the mobile data transfer network 13.

In the following description, it is assumed that a packet flowing through the IP tunnel is encapsulated with information including respective transfer network IP addresses of the cloud data transfer network 35 and the mobile data transfer network 13.

The cloud LAN configuration apparatus 32 notifies the information (a username, a terminal identifier of the mobile terminal, etc.) acquired from the service order reception apparatus 31 to the server (on the cloud) having the PGW 34 and the cloud LAN switch 36 implemented thereon. On reception of the notification, the server generates the PGW 34 and the cloud LAN switch 36, both dedicated to the specific user. For instance, the server generates (instantiates) a virtual machine and generates the PGW 34 and the cloud LAN switch 36 dedicated to the specific user on the virtual machine. Alternatively, the cloud LAN configuration apparatus 32 may send to an appliance customized in realizing gateway and switching functions a notification to generate the PGW 34 and the cloud LAN switch 36 dedicated to the specific user. That is, the cloud LAN configuration apparatus 32 generates the PGW 34 and the cloud LAN switch 36 dedicated to the user on a server or appliance on the cloud.

The server, upon generation of the PGW 34 and the cloud LAN switch 36, notifies detailed information thereof (e.g., a mobile terminal 11 of an allocation target and an IP address of the PGW 34, etc.) to the cloud LAN configuration apparatus 32 (notification of the cloud LAN information).

The cloud LAN configuration apparatus 32 notifies the PGW 34, etc., of the information (the cloud LAN information) notified by the server in order to achieve data transfer between the PGWs 34 or between the PGW 34 and the cloud LAN switch 36. That is, the cloud LAN configuration apparatus 32 notifies, to the user information management apparatus 33, the mobile terminal information, the cloud LAN information relating to the PGW 34 and the cloud LAN switch 36 acquired from the service order reception apparatus 31.

The PGW 34 is a cloud LAN gateway assigned to each user. The PGW 34 terminates an encapsulated IP packet of a tunnel session on the cloud data transfer network 35 and the mobile data transfer network 13. The PGW 34 has a function of processing a decapsulated user packet, performing appropriate IP encapsulation, and then forwarding the packet to a tunnel session on a data transfer network.

Figure 6:
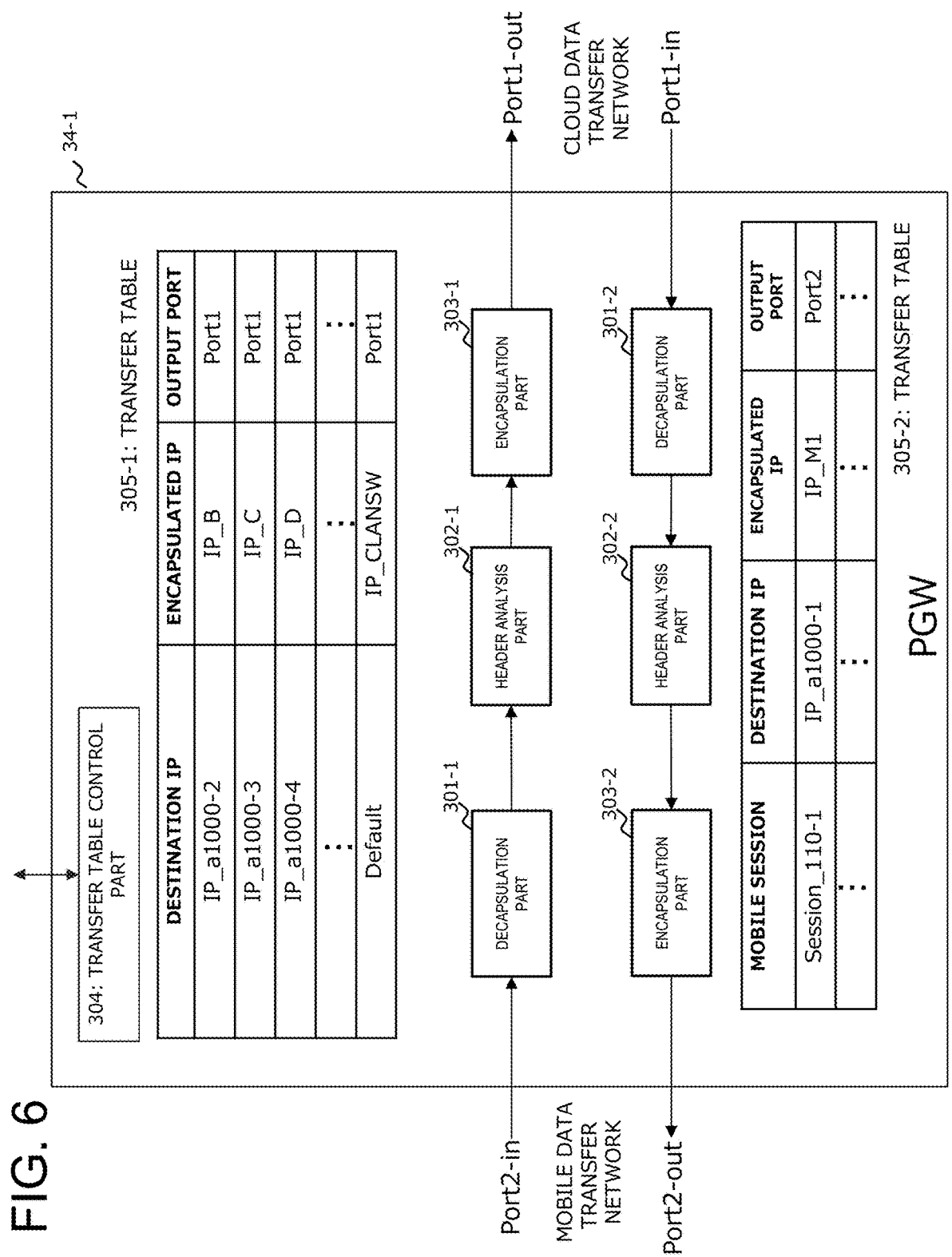
FIG. 6 is a diagram illustrating an example of ae processing configuration of a PGW according to the second example embodiment.

FIG. 6 illustrates a specific processing configuration of the PGW 34-1. As illustrated in FIG. 6, the PGW 34-1 is configured to include decapsulation parts 301, header analysis parts 302, encapsulation parts 303, a transfer table control part 304, and transfer tables 305.

The transfer table control part 304 receives information transmitted from outside (the cloud LAN configuration apparatus 32, the user information management apparatus 33, and the terminal-IP management apparatus 37). The transfer table control part 304 generates an entry to be stored in the transfer table 305-1 for the cloud LAN and entry to be stored in the transfer table 305-2 for the mobile data transfer network 13 based on the received information and registers the entries in each table.

In the example of FIG. 6, an entry indicating that a packet having a destination IP address of "IP_a1000-2" is encapsulated to a packet having an encapsulated IP address "IP_B" as a destination IP address and outputted from a port 1 is registered in the transfer table 305-1. Note that an IP address illustrated in FIG. 6 is used by the mobile terminal 11 when utilizing the cloud LAN, and an encapsulated IP address is the IP address of the PGW 34 assigned to each mobile terminal 11.

In the example of FIG. 6, it is indicated that a packet with a destination IP address being an assigned IP address of "IP_a1000-2" is outputted from the port 1 towards the PGW 34 with the IP address of "IP_B".

An entry registered in the transfer table 305-1 can be generated mainly based on information transmitted from the terminal-IP management apparatus 37. The information transmitted from the terminal-IP management apparatus 37 will be described in detail later.

The transfer table control part 304 registers an entry in the transfer table 305-2 for the mobile data transfer network. In the example of FIG. 6, it is indicated that a packet which is accommodated in a tunnel and generated as "Session_110-1" is outputted from a port 2 with an encapsulated IP address ("IP_M1," which is an IP address of the base station 12) as a destination.

An entry registered in the transfer table 305-2 can be generated mainly based on information transmitted from the user information management apparatus 33 and the terminal-IP management apparatus 37.

The decapsulation part 301 is means for decapsulating an encapsulated packet when a packet forwarded in a communication channel of the mobile data transfer network 13 or the cloud data transfer network 35 is encapsulated. The decapsulation part 301 decapsulates an encapsulated data packet from the cloud data transfer network 35 or the mobile data transfer network 13 to extract a user packet. Then, the decapsulation part 301 forwards the user packet extracted to the header analysis part 302.

The header analysis part 302, with reference to the transfer table by using a network identifier (destination IP address) extracted from the decapsulated packet as a search key, determines a network identifier (encapsulated IP address) of a destination of the packet. That is, the header analysis part 302 analyzes a header of the user packet extracted to identify a destination IP address of the user packet. Then, the header analysis part 302 searches the transfer table 305 using the destination IP address as a search key to obtain a corresponding encapsulated IP address.

The encapsulation part 303 performs encapsulation adapted to a network of a packet forwarding destination, by using the network identifier determined (encapsulated IP address). The encapsulation part 303 converts the user packet to an encapsulated data packet with the encapsulated IP address retrieved as a destination IP address. In the example of FIG. 6, a user packet extracted by the decapsulation part 301-1 is converted to a packet with "IP_B as a destination address.

A user packet extracted by the decapsulation part 301-2 is converted to a packet with "IP_M1" as a destination address. The encapsulation part 303 transmits the data packet encapsulated to the mobile data transfer network 13 or the cloud data transfer network 35.

It is noted that the encapsulation part 303 is able to encapsulate, by using a default destination IP address, a user packet even with a destination IP address not registered in the transfer table 305, when the default encapsulated IP address is registered (specified).

FIG. 6 illustrate an example in which a module performing processing of an upstream packet (from the mobile data transfer network 13 to the cloud data transfer network 35) is different from a module performing processing of a downstream packet. But, the same modules may, as a matter of course, perform processing of upstream and downstream packets. The information in two transfer tables 305 may, as a matter of course, be managed as one table.

Since the processing configuration of the PGW 34-2 may be identical to that of the PGW 34-1, a detailed description thereof will be omitted.

Returning to FIG. 5, the user information management apparatus 33 includes a function of connecting an appropriate PGW 34 to the mobile terminal 11. The user information management apparatus 33 selects a PGW 34 to be connected based on information (a terminal identifier, affiliation, location information, etc.) transmitted from the mobile terminal 11, when the mobile terminal is connected to the mobile data transfer network 13.

Then, the user information management apparatus 33 notifies information used for constructing a tunnel between this PGW 34 and the base station 12 (the mobile terminal 11)

to the PGW 34 and the base station 12. For instance, the user information management apparatus 33 notifies the PGW 34-1 of a tunnel session name, an encapsulated IP address (address of the base station 12), and a forwarding port. The user information management apparatus 33 notifies information similar to the notified information above (a tunnel session name, an address of the PGW 34-1 (an encapsulated IP address), and a forwarding port) to the base station 12-1.

The user information management apparatus 33 performs alive monitoring on the mobile terminal 11. For instance, the user information management apparatus 33 performs the alive monitoring by transmitting a heartbeat signal to the mobile terminal 11 periodically to check whether or not an appropriate response to the signal can be obtained. When the alive monitoring cannot detect the mobile terminal 11, the user information management apparatus 33 terminates the corresponding tunnel session.

When setting up or releasing a session, the user information management apparatus 33 notifies the terminal-IP management apparatus 37 of the mobile terminal information, the cloud LAN information, and the session information.

As described above, the mobile terminal information is information that can be acquired from the service order reception apparatus 31 via the cloud LAN configuration apparatus 32 (e.g., a username and a terminal identifier of the mobile terminal 11).

The cloud LAN information is information generated when the cloud LAN configuration apparatus 32 allocates a cloud LAN resource(s) to a specific user. Specifically, the cloud LAN information includes IP addresses of the PGW 34 and the cloud LAN switch 36 both assigned to the mobile terminal 11 of the specific user, and an identifier (specific information) of the mobile terminal 11.

The session information is information that identifies a mobile session constructed by the user information management apparatus 33 on the mobile data transfer network 13. For instance, the session information includes a session name and an identifier (IP address) of a termination apparatus.

The terminal-IP management apparatus 37 determines (generates) an IP address to be assigned to the mobile terminal 11, based on additional mobile terminal information (session set up notification for the mobile terminal 11) from the user information management apparatus 33. The terminal-IP management apparatus 37 notifies the assigned IP address to the mobile terminal 11 through the tunnel session. To the mobile terminal 11 of the user receiving the cloud LAN service, the terminal-IP management apparatus 37 assigns an IP address uniquely identifying the mobile terminal on the cloud LAN. For instance, the destination IP addresses (IP_a1000-1, and IP_a1000-2) illustrated in FIG. 6 correspond to the assigned IP addresses.

As illustrated in FIG. 7, the terminal-IP management apparatus 37 creates a mobile terminal management table 306 which includes fields such as an identifier of the mobile terminal 11, an IP address assigned to each mobile terminal 11, a used mobile session, and an IP address of the connected PGW. Since each type of the information (mobile terminal information, cloud LAN information, and session information) acquired by the terminal-IP management apparatus 37 is associated with the terminal identifier of the mobile terminal 11, the terminal-IP management apparatus 37 creates the mobile terminal management table 306 based on this association.

As described above, the terminal-IP management apparatus 37, as illustrated on FIG. 7, assigns a network identifier (assigned IP address) to a connection terminal (a mobile terminal 11 attempting to access the cloud data transfer network 35). In the mobile terminal management table 306, the identifier (specific information) of a connection terminal is associated with a network identifier assigned to the connection terminal and a network identifier (IP address of the PGW mobile) of the access point (the PGW 34) assigned to the connection terminal.

According to the mobile terminal management table 306 illustrated in FIG. 7, for the mobile terminal 11-1, IP_a1000-1, Session_110-1, and IP_A are registered as an assigned IP address, a mobile session, and an IP address of the connected PGW, respectively (the first row in the table).

These items indicate the following. The mobile terminal 11-1 uses "IP_a1000-1" as an IP address thereof when accessing the cloud LAN. The mobile terminal 11-1 uses the PGW 34 with an IP address of "IP_A" as an access point when transmitting a packet to the cloud LAN system 30. The mobile terminal 11-1 also uses the mobile session "Session_110-1" for receiving a packet from the cloud LAN system.

As for the mobile terminal 11-2, IP_a1000-2, Session_110-2, and IP_B are registered in a similar manner.

The terminal-IP management apparatus 37 distributes the mobile terminal management table 306 to the PGWs 34-1 and 34-2 and the cloud LAN switch 36, which are the cloud LAN resources (communication nodes assigned to each user).

It is noted that storage means storing the mobile terminal management table 306 is not illustrated in FIG. 6 and FIG. 8 which is described later. Once acquiring information indicating that a mobile terminal is deleted (session release notification for the mobile terminal 11 released), the terminal-IP management apparatus 37, as a matter of course, deletes a corresponding entry from the mobile terminal management table 306 and redistributes the table.

The cloud data transfer network 35 provides a function of performing data transfer between the PGW 34 and the cloud LAN switch 36. The cloud data transfer network 35 performs the data transfer processing based on a destination network identifier (an encapsulated IP address described above) of the tunnel session.

In the present application disclosure, the network identifier is an IP address, but it may be a MAC (Media Access Control) address or MPLS (Multi-Protocol Label Switching) LSP (Label Switched Path) label.

The cloud LAN switch 36 decapsulates a received data packet to extract a user packet. The cloud LAN switch 36 includes a function of switching (routing) the user packet based on a destination of the packet, appropriately encapsulating the user packet, and transmitting the encapsulated packet.

Figure 8:
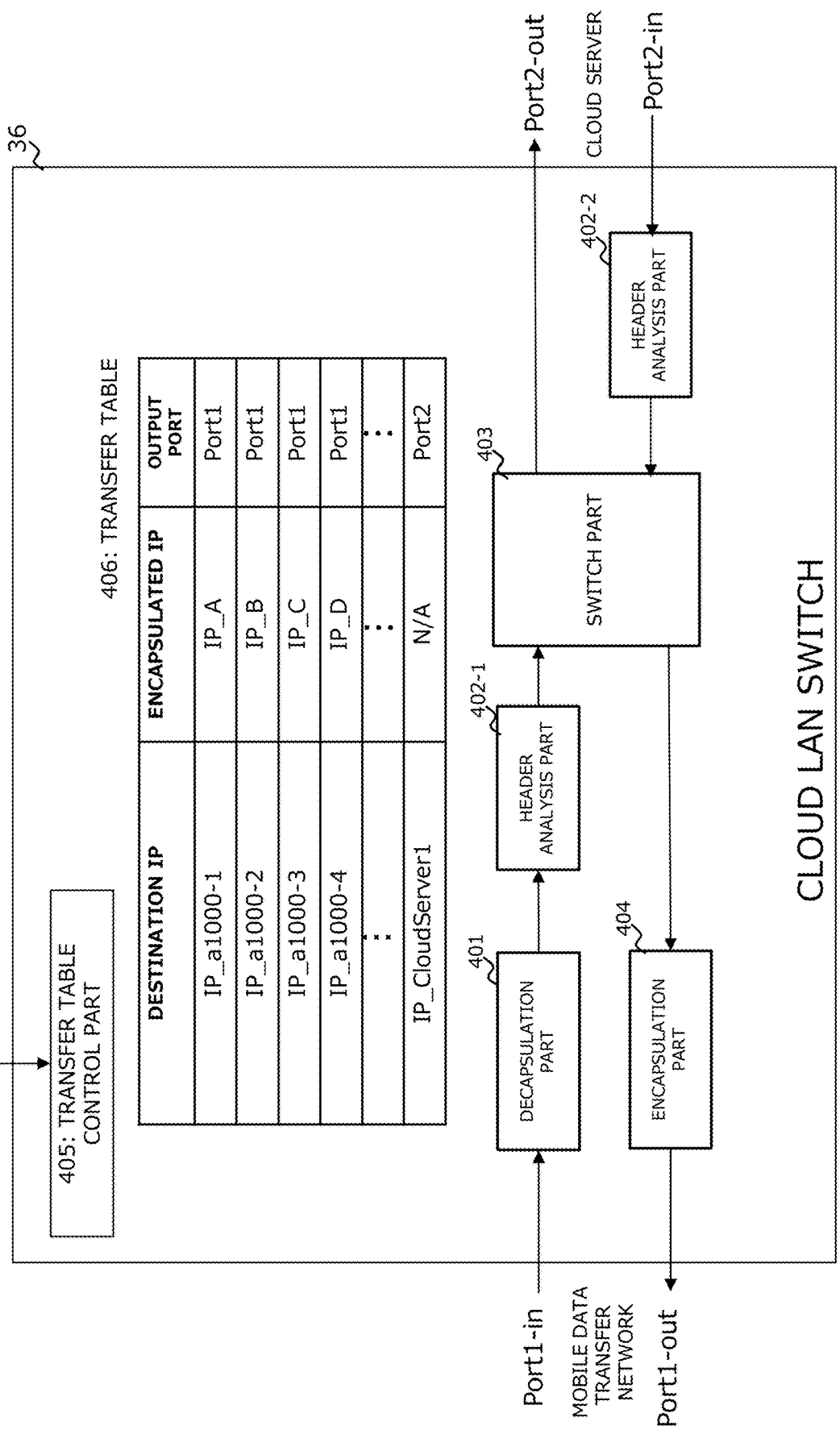
FIG. 8 is a diagram illustrating an example of a processing configuration of a cloud LAN switch according to the second example embodiment

FIG. 8 is a diagram illustrating an example of the processing configuration of the cloud LAN switch 36. With reference to FIG. 8, the cloud LAN switch 36 is configured to include a decapsulation part 401, header analysis parts 402-1 and 402-2, a switch part 403, an encapsulation part 404, a transfer table control part 405, and a transfer table 406.

The transfer table control part 405 receives information transmitted from outside (the cloud LAN configuration apparatus 32 and the terminal-IP management apparatus 37). Then, based on the received information, the transfer table control part 405 registers a destination IP address (an IP address assigned to a destination terminal), a corresponding encapsulated IP address, and a transmission port (a forwarding port) in the transfer table 406. The transfer table control part 405 generates an entry to be registered in the transfer table 406 based the mobile terminal management table 306.

The decapsulation part 401 decapsulates an encapsulated data packet from the cloud data transfer network 35 to extract a user packet. Then, the decapsulation part 401 forwards the user packet extracted to the header analysis part 402-1.

The header analysis part 402-1, with reference to the destination IP address of the user packet, searches for a corresponding encapsulated IP address, and transmission port in the transfer table 406, by using the destination IP address as a key.

Then, based on the information searched, the switch part 403 hands over the user packet extracted to the encapsulation part 404 connected to the transmission port.

The encapsulation part 404 converts the user packet to an encapsulated data packet with an encapsulated IP address searched as a destination IP address. The encapsulation part 404 transmits the data packet encapsulated to the cloud data transfer network 35.

The header analysis part 402-2 is means for analyzing a header of a packet transmitted from the cloud server 14 to the cloud data transfer network 35.

When a default encapsulated IP address is registered (specified), the encapsulation part 404 will be able to encapsulate a user packet with a destination IP address not registered in the transfer table 406, by using the default destination IP address. The encapsulation part 404 is also able to send a user packet without encapsulating the packet to outside.

What described above is the configuration of the system according to the second example embodiment.

Next, with reference to the drawings, an operation in which a user A subscribes to the cloud LAN service and data is transferred between the mobile terminals 11-1 and 11-2. It can be assumed that the user A is an enterprise (corporate) user.

The user A subscribes to the cloud LAN service via the service order reception apparatus 31. The service order reception apparatus 31 instructs the cloud LAN configuration apparatus 32 to construct a cloud LAN for the user A. As a result, the PGWs 34-1 and 34-2 and the cloud LAN switch 36 are generated as gateways (access points) and a switch for the user A, respectively.

The cloud LAN configuration apparatus 32 distributes encapsulated IP addresses for the cloud data transfer network 35 to the PGWs 34-1 and 34-2, and the cloud LAN switch 36, respectively. That is, the cloud LAN configuration apparatus 32 transmits cloud LAN information to the communication nodes generated.

The PGWs 34-1 and 34-2 register, in the transfer tables 305, the encapsulated IP address of the cloud LAN switch 36 as a default encapsulated IP address to the cloud data transfer network (e.g., a bottom row in the transfer table 305-1 illustrated in FIG. 6).

The user A newly adds the mobile terminals 11-1 and 11-2 to the mobile data transfer network 13. It is assumed that a fact that the mobile terminals 11-1 and 11-2 belong to the user A is registered in advance. This kind of user identification is realized by SIM (Subscriber Identity Mobile) in the mobile world. The present application disclosure assumes that a user is identified by SIM.

The mobile terminals 11-1 and 11-2, upon power-on, transmit a terminal registration request to the user information management apparatus 33. The user information management apparatus 33 receives the request and obtains location information and a fact that the mobile terminals 11 belong to the user A from the specific information of the mobile terminals 11.

The user information management apparatus 33 establishes a tunnel session traversing from the base station 12 to the mobile data transfer network 13 on the mobile data transfer network 13 in order to connect the mobile terminals 11-1 and 11-2 to the PGWs 34-1 and 34-2, respectively.

Then, the terminal-IP management apparatus 37, which is instructed by the user information management apparatus 33 (h necessary information is provided), gives assigned IP addresses "IP_a1000-1" and "IP_a1000-2" to the mobile terminals 11-1 and 11-2.

The terminal-IP management apparatus 37 notifies the IP addresses to the mobile terminals 11-1 and 11-2 via the tunnel session. At this time, the terminal-IP management apparatus 37 creates the mobile terminal management table 306, as illustrated in FIG. 7. Since the mobile terminal management table 306 is as described above, the description thereof will be omitted.

The terminal-IP management apparatus 37 distributes the mobile terminal management table 306 to the PGW 34 and the cloud LAN switch 36.

On reception of the mobile terminal management table 306, the PGW and the cloud LAN switch 36 each determine encapsulated IP addresses and transmission ports for destination IP addresses, based on the information received to register these items of information in the transfer tables 305 and 406, respectively.

The PGW 34 is able to identify the mobile terminal 11 assigned thereto from the cloud LAN information. Therefore, the PGW 34 recognizes that a packet destined to the mobile terminal 11 assigned thereto needs to be forwarded to the mobile data transfer network 13. The PGW 34 recognizes that a packet destined to a mobile terminal 11 assigned to another apparatus needs to be forwarded to the cloud data transfer network 35. The PGW 34 is able to create the transfer tables as illustrated in FIG. 6, by using the recognition result described above and the mobile terminal management table 306.

For instance, the mobile terminal 11-1 is assigned to the PGW 34-1. Hence, when a destination of a packet is an IP address of the mobile terminal 11-1, as indicated in the first row of the mobile terminal management table 306 in FIG. 7, the packet needs to be outputted to the mobile data transfer network 13. The PGW 34-1 determines that a transfer destination network of the packet is the mobile data transfer network 13 and that a destination is the base station 12-1 at an opposite end of the mobile session 110-1. As a result, an entry to be stored in the transfer table 305-1 illustrated in FIG. 6 is generated.

Based on the information of the second and subsequent rows in the mobile terminal management table 306 of FIG. 7, it can be grasped that a packet with an IP address of a terminal other than the mobile terminal 11-1 as a destination needs to be forwarded to another PGW 34. Hence, the PGW 34-1 determines that a transfer destination of the packet is the mobile data transfer network 13 and that a destination IP address thereof is an IP address of the PGW 34 assigned to the individual mobile terminal 11. As a result, an entry to be stored in the transfer table 305-1 illustrated in FIG. 6 is generated.

The transfer table 406 of the cloud LAN switch 36 can also be generated from the mobile terminal management table 306. That is, the cloud LAN switch 36 may create a transfer table 406, according to which a packet with an address of a mobile terminal 11 as a destination IP address is forwarded to the cloud data transfer network 35.

After the above described process is completed, the mobile terminal 11-1 is enabled to forward a user packet to the mobile terminal 11-2.

More specifically, the mobile terminal 11-1 sends a user packet with a destination IP address "IP_a1000-2" and a source IP address "IP_a1000-1." The user packet is converted to an encapsulated data packet with an IP address of the PGW 34-1 as a destination address. The encapsulated data packet is forwarded to the PGW 34-1 via the base station 12-1 and the mobile data transfer network 13. At this time, a tunnel "Session_110-1" is used.

On reception of the encapsulated data packet, the PGW 34-1 decapsulates the packet. Then, the PGW 34-1 finds, in the transfer table 305-1, a destination IP address "IP_B" of the cloud data transfer network 35 corresponding to the destination IP address "IP_a1000-2" of the user packet.

Then, the user packet is converted to an encapsulated data packet with a destination IP address "IP_B". The encapsulated data packet is forwarded to the cloud data transfer network 35. The encapsulated data packet is forwarded to the PGW 34-2 via the cloud data transfer network 35 based on the destination IP address "IP_B."

The PGW 34-2 decapsulates the encapsulated packet received and refers to (acquires) the destination IP address "IP_a1000-2" of the user packet. The PGW 34-2, with reference to the transfer table 305-2, finds a destination IP address "IP_M2" of the mobile data transfer network 13 from the destination IP address "IP_a1000-2" acquired.

Then, the PGW 34-2 generates an encapsulated data packet and outputs the encapsulated data packet to the mobile data transfer network 13. The encapsulated data packet is forwarded to the mobile terminal 11-2 through a tunnel "Session 110-2."

The mobile terminal 11-2 receives the encapsulated data packet and extracts a user packet therefrom.

As described above, based on the mobile terminal management table 306, the PGW 34 creates a transfer table used for transferring a received packet. The PGW 34 determines a transfer destination network (the mobile data transfer network 13, and the cloud data transfer network 35) from the transfer table 305, using a network identifier (a destination IP address) included in a received packet as a search key. The packet is transmitted to a network determined. Likewise, based on the mobile terminal management table 306, the cloud LAN switch 36 creates a transfer table used for transferring a received packet. The cloud LAN switch 36 determines a transfer destination on the cloud LAN from the transfer table 406, using the network identifier included in the received packet as a search key. The packet is transmitted to the transfer destination determined. A user packet is forwarded from the mobile terminal 11-1 to the mobile terminal 11-2, in this way. That is, a user packet is transmitted from the mobile terminal 11-1 to the mobile terminal 11-2.

Though in the above description, a packet is forwarded using an IP address or a MAC address as a network identifier, but a different network identifier, for instance, an MPLS LSP may be used.

As described above, in the second example embodiment, a cloud LAN dedicated to each user is configured and communication between the mobile terminals 11 is carried out using the cloud LAN. As a result, communication with small delay can be realized between the mobile terminals 11. This is because direct user packet communication is possible between the PGWs 34 (a first effect). As a second effect, a communication efficiency between the mobile terminals 11 is improved. This is because direct user packet communication is possible between the PGWs 34, with no need for a packet not to be forwarded once to the cloud LAN switch 36, which is an aggregation switch. A third effect is that a destination PGW 34 of a user packet can easily be determined. This is because the terminal-IP management apparatus 37 centrally manages association between the mobile terminal and the PGW 34. This eliminates a need to perform a complex decentralized information exchange between the PGWs 34.

Third Example Embodiment

Next, a third example embodiment will be described in detail with reference to the drawings.

In the second example embodiment, it is assumed that all connection terminals (mobile terminals 11) are managed in the mobile terminal management table 306 generated by the terminal-IP management apparatus 37 and that the management information is shared by the PGWs 34 and the cloud LAN switch 36. Therefore, depending on the number of mobile terminals 11, the management information may greatly exceed an amount of information that can be registered in the transfer table of the PGW 34. It is reasonable to limit an amount of information to be distributed so as not to exceed a capacity of the transfer table.

The third example embodiment describes a case where an amount of information that the PGW 34 can store in the transfer table is limited. Note that a basic configuration of the cloud LAN system may be made identical to the one described with reference to FIGS. 2 and 5.

In the third example embodiment, structure and format of the mobile terminal management table obtained based on the terminal-IP management apparatus 37 and an internal configuration of the PGW 34 are different from the example embodiments described above. In the third example embodiment, the difference will be mainly described.

FIG. 9 is a diagram illustrating an example of a mobile terminal management table 306a generated by the terminal-IP management apparatus 37 according to the third example embodiment. With reference to FIG. 9, a "direct access" field is added to the mobile terminal management table described in the second example embodiment.

The direct access indicates communication in which low delay is desired due to an attribute of the mobile terminal 11. When the field is checked (the direct access is enabled), a data packet is expected to be directly forwarded between the PGWs 34.

The terminal-IP management apparatus 37 relating to the third example embodiment directly transmits, to the PGW 34, the mobile terminal management table 306a with the direct access field as it is, or only one or more entries with the direct access filed enabled in the mobile terminal management table 306a. It is be noted that a user enters whether or not to make a direct access effective via the service order reception apparatus 31, which is notified to the terminal-IP management apparatus 37 as the mobile terminal information.

Figure 10:
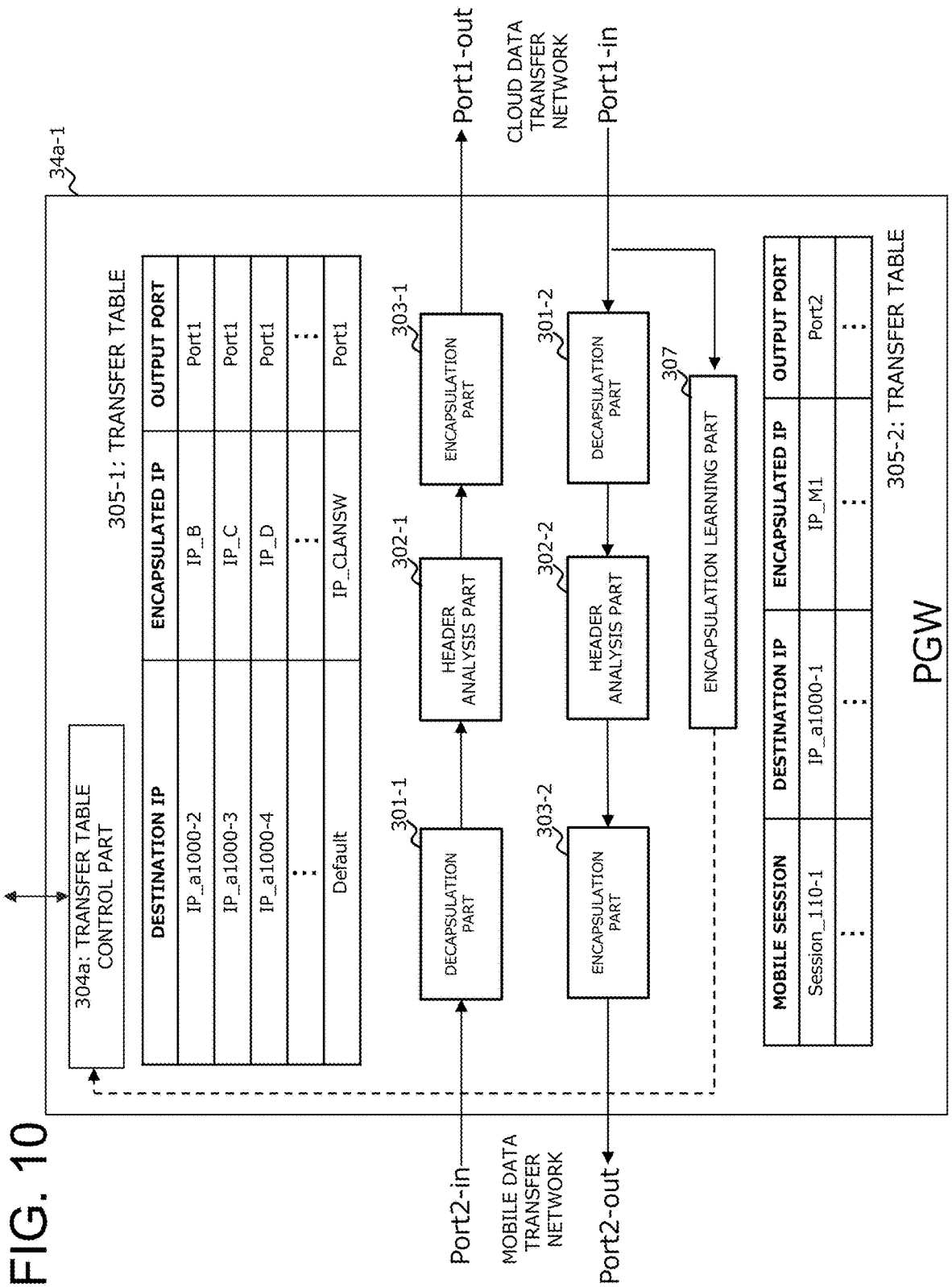
FIG. 10 is a diagram illustrating an example of a processing configuration of a PGW according to a third example embodiment.

FIG. 10 is a diagram illustrating an example of the processing configuration of the PGW 34-1 according to the third example embodiment. Referring to FIGS. 6 and 10, the PGW 34 according to the third example embodiment differs from that of the second example embodiment in an operation of a transfer table control part 304a and in that an encapsulation learning part 307 is provided. Since other elements can be the same as those described in the second example embodiment, the description thereof will be omitted.

The following will mainly describe differences (the transfer table control part 304a and the encapsulation learning part 307).

On reception of the mobile terminal management table 306a from the terminal-IP management apparatus 37, the transfer table control part 304a registers with high priority information with the direct access filed enabled in the transfer table 305.

The encapsulation learning part 307 duplicates a part of an encapsulated data packet forwarded from the cloud data transfer network 35 and configures the transfer table 305 on a learning basis.

Figure 11:
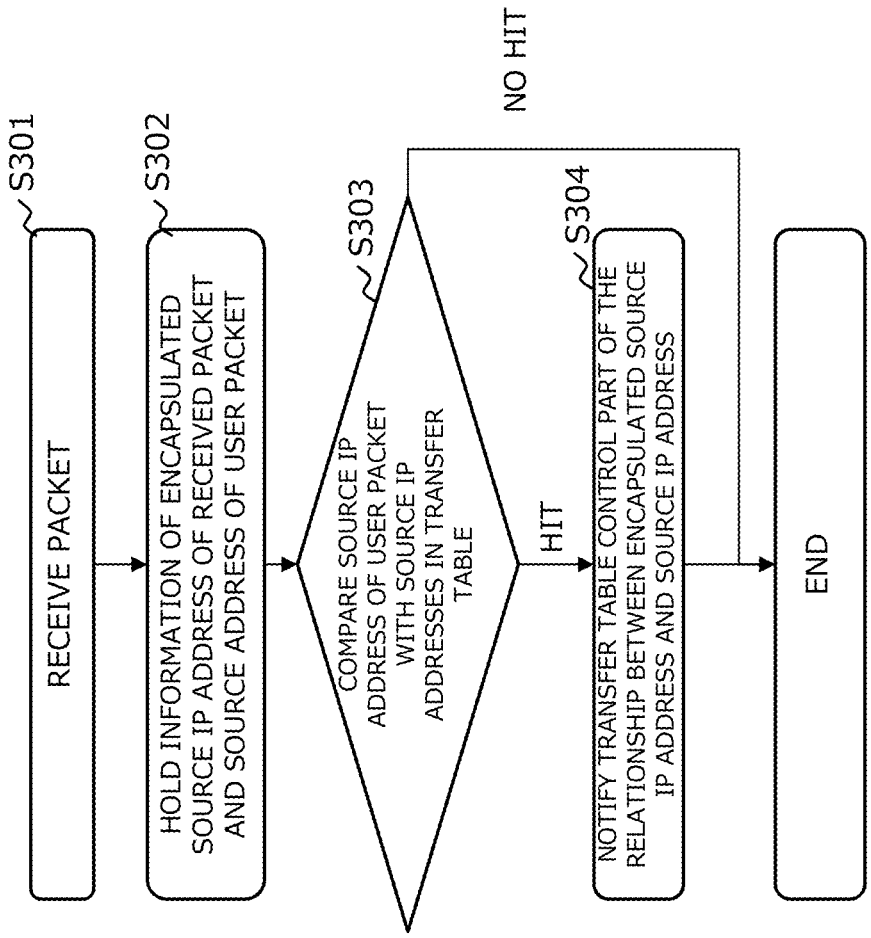
FIG. 11 is a flowchart illustrating an example of an operation of an encapsulation learning part according to the third example embodiment.

With reference to FIG. 11, an operation of the encapsulation learning part 307 will be described.

The encapsulation learning part 307 receives an encapsulated IP packet (step S301).

The encapsulation learning part 307 holds information of an encapsulated source IP address of the packet received and a source IP address of a user packet (step S302).

The encapsulation learning part 307 compares the source IP address of the user packet extracted in the step S302 with source IP addresses included in the transfer table 305 (step S303). That is, the encapsulation learning part 307 checks whether or not the source IP address of the user packet is included in the transfer table 305.

When it is found that the source IP address of the user packet is presents in the transfer table 305 (there is a hit as a result of the step S303), the encapsulation learning part 307 executes processing of step S304. The encapsulation learning part 307 in the step S304 notifies the transfer table control part 304a of relationship between the encapsulated source IP address held in the step S302 and the source IP address of the user packet.

The transfer table control part 304a reflects the relationship of the IP addresses notified in the transfer table 305.

When it is found that the source IP address of the user packet is not present in the transfer table 305 (there is no hit as a result of the step S303), processing ends.

The above described operation enables two-way direct communication between the PGWs 34. Note that a user packet can still be exchanged via the cloud LAN switch 36 even without direct communication between the PGWs 34. That is, presence of the cloud LAN switch 36 enables data packet exchange even when the information relating to direct access is not immediately updated in the transfer table 305 in the PGW 34.

As described, in the third example embodiment, the PGW 34a refers to the transfer table 305 using a network identifier (IP address) corresponding to a source of an encapsulated packet forwarded from the cloud LAN, as a search key. When it is found that the network identifier corresponding to the source is present in the transfer table 305, a network identifier corresponding to the source and a network identifier (encapsulated IP address) corresponding to the source of the encapsulated packet are registered in the transfer table 305 in association with each other. Furthermore, the mobile terminal management table 306a includes direct access information to specify that an entry therewith is to be registered with priority in the transfer table 305. The PGW 34a registers an entry with the direct access information with priority in the transfer table 305. As a result, the following effects can be obtained.

In the third example embodiment, in addition to the aforementioned first to third effects, the following effects are obtained.

The fourth effect is that a small size of the transfer table 305 in the PGW 34a, with relationship between a destination IP address and an encapsulated IP address referenced does not present any problem and data packet communication can be achieved between the PGWs 34a. This is because registration to the transfer table is not for all mobile terminals 11 but is limited to selected mobile terminals 11. The fifth effect is that the PGWs 34a are able to implement two-way direct communication with the mobile terminals 11 corresponding to destination IP addresses selected and registered in the transfer table 305, thereby increasing a resource utilization efficiency. This is because the PGW 34a, which accommodates a selected and registered mobile terminal 11, learns and associates a source IP address and an encapsulated IP address of a user packet transmitted to the mobile terminal 11 to reflect the association in the transfer table. As a result, two-way direct communication between the PGWs 34 becomes possible.

A hardware configuration of each apparatus described in the example embodiments will be described.

[Hardware Configuration]

Figure 12:
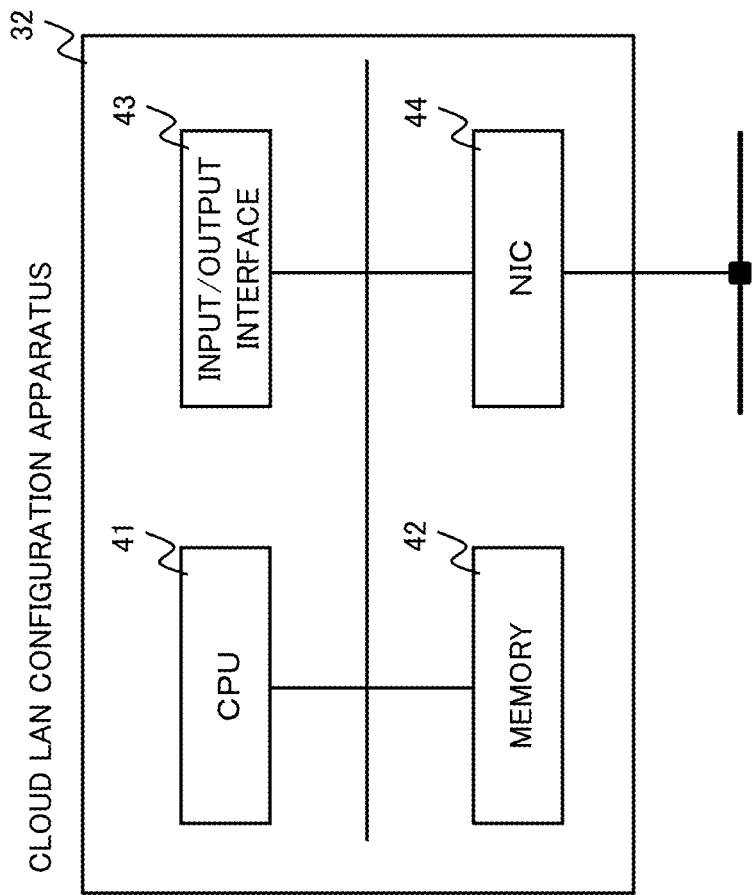
FIG. 12 is a diagram illustrating an example of a hardware configuration of a cloud LAN configuration apparatus.

FIG. 12 is a diagram illustrating an example of a hardware configuration of the cloud LAN configuration apparatus 32. The cloud LAN configuration apparatus 32 may be implemented by a computer to have a configuration illustrated in FIG. 12. For instance, the cloud LAN configuration apparatus 32 includes a CPU (Central Processing Unit) 41, a memory 42, an input/output interface 43, and a NIC (Network Interface Card) 44, which is a communication interface. These elements are interconnected by an internal bus.

The configuration illustrated in FIG. 12 is not intended to limit a hardware configuration of the cloud LAN configuration apparatus 32. The cloud LAN configuration apparatus 32 may include hardware not illustrated in the diagram. The number of CPUs, etc., included in the cloud LAN configuration apparatus 32 is not limited to the illustration of FIG. 12. For instance, a plurality of the CPUs 41 may be included in the cloud LAN configuration apparatus 32.

The memory 42 may be a RAM (Random Access Memory), a ROM (Read-Only Memory), or auxiliary storage apparatus (hard disk and the like).

The input/output interface 43 is an interface for an input/output apparatus not illustrated in the diagram. For instance, the input/output apparatus may be a display apparatus, an operation apparatus, etc. The display apparatus is, for instance, a liquid crystal display. The operation apparatus is, for instance, a keyboard and a mouse.

The functions of the cloud LAN configuration apparatus 32 may be implemented by modules executing processes described above. For instance, the module is realized by having the CPU 41 execute a program stored in the memory 42. The program may be downloaded via a network or updated using a storage medium storing the program. The processing module may be realized by a semiconductor chip. That is, the function performed by the processing module may be realized by some kind of hardware or by software running on hardware.

Since the hardware configurations of the other apparatuses (the user information management apparatus 33, the server that realizes the PGW 34, etc.) can be identical to that of the cloud LAN configuration apparatus 32 and apparent to those skilled in the art, the description thereof will be omitted.

The effects obtained by the cloud LAN system of the above described example embodiments above are as follows.

A first effect is that there is no need for a user to prepare a LAN system. This is because a user-specific LAN can be constructed in the cloud LAN system providing a service. Since the user does not need a LAN system, it becomes unnecessary to be concerned with a long-term data transmission/reception amount of the LAN.

A second effect is that communication with small delay can be achieved between the mobile terminals 11 since the communication does not go through a user LAN.

A third effect is that communication with small delay can be achieved between the mobile terminals 11. This is because direct user packet communication is made possible between the PGWs 34 without going through an aggregation switch CLANSW.

A fourth effect is that a communication efficiency between the mobile terminals 11 can be improved. This is because direct data packet communication is made possible between the PGWs 34 with no need for a data packet to be forwarded to the cloud LAN switch 36, which is an aggregation switch.

A fifth effect is that a destination PGW 34 of a user packet can be easily determined. This is because the terminal-IP management apparatus 37 centrally manages associations between the mobile terminals and the PGWs 34 to notify a transfer (forwarding) destination of the user packet to the PGW 34, which s eliminates a need for complex decentralized information exchange between the PGWs 34. Normally, when a switching function is decentralized, there may be a case where a transfer path may form a loop and a packet may not reach a destination terminal. Therefore, a routing protocol is required to deliver a packet to a destination without creating a loop. The fifth effect can eliminate a need for such a routing protocol and prevent control complexity.

A sixth effect is that, even when a size of a transfer table in the PGW 34 indicating relationship between an IP address of a destination terminal and an encapsulated IP address of a transfer network is small, data packet communication according to a terminal attribute can be achieved. The reason for this is that only selected mobile terminals are registered in the transfer table and the number of registered terminals is reduced. Since the transfer table 305 specifies a default forwarding address, it is possible to send a packet to a mobile terminal 11 not having an IP address of a destination terminal listed in the table.

A seventh effect is that the PGWs 34 are able to achieve two-way direct communication with the mobile terminals 11 corresponding to a destination IP address selected and registered in the transfer table 305, thereby increasing a resource utilization efficiency. This is because the PGW 34 accommodating a selected and registered mobile terminal 11, learns to associates an source IP address and an encapsulated IP address of a user packet transmitted to the mobile terminal 11 to reflect the association therebetween in the transfer table. As a result, two-way direct communication between the PGWs 34 becomes possible.

Relationship between the present invention and Patent Literature 1 can be summarized as follows. In Patent Literature 1, where a mobile terminal is accommodated by an aggregation LAN switch in a network connecting the aggregation LAN switch provided in a cloud data transfer network and a mobile data transfer network, depending on a physical distance from the LAN switch and a data transfer (forwarding) destination, delay may occur and a network utilization efficiency may deteriorate. In the system of the present application disclosure, a packet gateway on a boundary between ae mobile data transfer network and a cloud data transfer network takes on a part of functions of an LAN switch, and a data packet is directly forwarded between the packet gateways without going through an aggregation LAN switch, which can eliminate such a problem as a delay and/or deterioration of a network utilization efficiency. There is no need for the packet gateways to exchange connection information with each other. There may be also equipped a packet-gateways direct connection function, only for the mobile terminals selected. There may be also equipped an encapsulated packet learning function to enable packet-gateways direct communication of a response from a mobile terminal selected.

[Variations]

Figure 13:
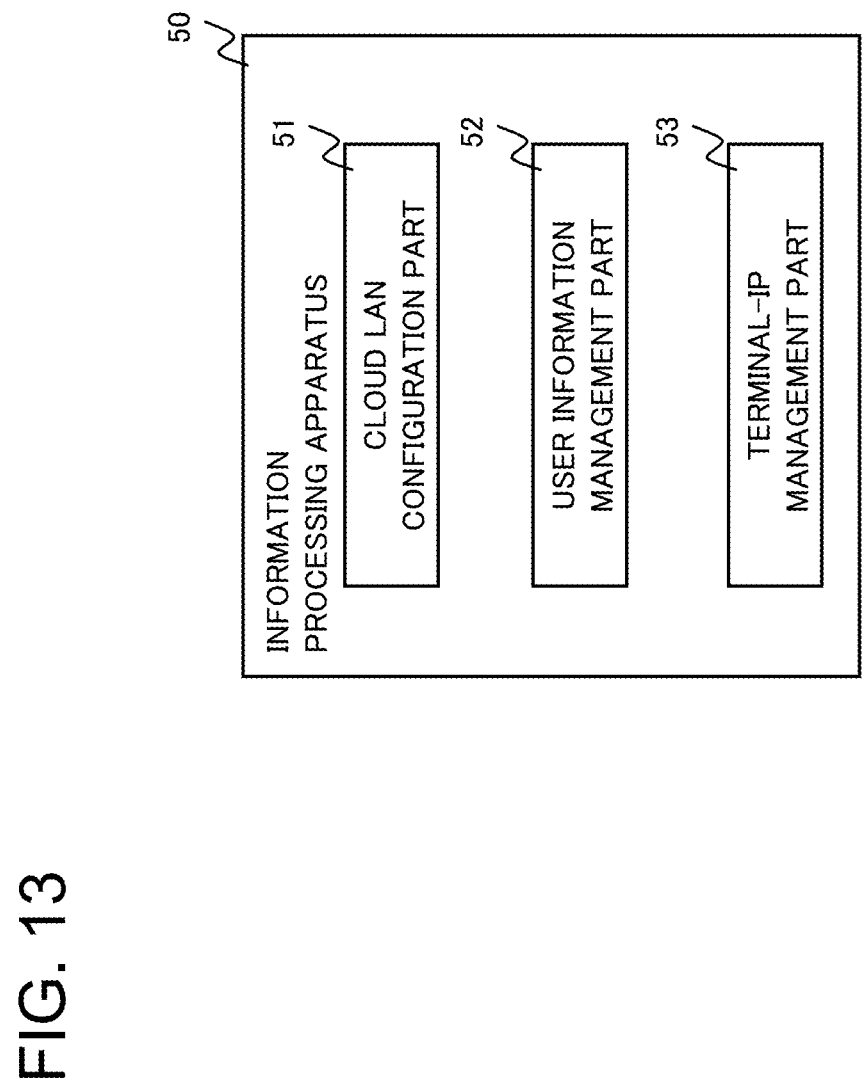
FIG. 13 is a diagram illustrating an example of a processing configuration of an information processing apparatus.

It is noted that the configuration and the operation of the cloud LAN system described in the first to the third example embodiments are examples not intended to limit the configuration and the operation of the system. For instance, in the above example embodiments, examples are described where the cloud LAN configuration apparatus 32, the user information management apparatus 33, and the terminal-IP management apparatus 37 perform respective functions. Alternatively, functions of these apparatuses may be performed by a single apparatus. For instance, an information processing apparatus 50 illustrated in FIG. 13 may be included in the cloud LAN system. The processing modules (the cloud LAN configuration part 51, the user information management part 52, and the terminal-IP management part 53) included in the information processing apparatus 50 can be made identical to the apparatus described above and thus, a detailed description thereof will be omitted.

In the above example embodiments, the cloud LAN configuration apparatus 32 instructs the server on the cloud to generate the PGW 34 and the cloud LAN switch 36. Alternatively, such an arrangement is possible wherein the cloud LAN configuration apparatus 32 may generate the PGW 34, etc., by using resources thereof.

Figure 14:
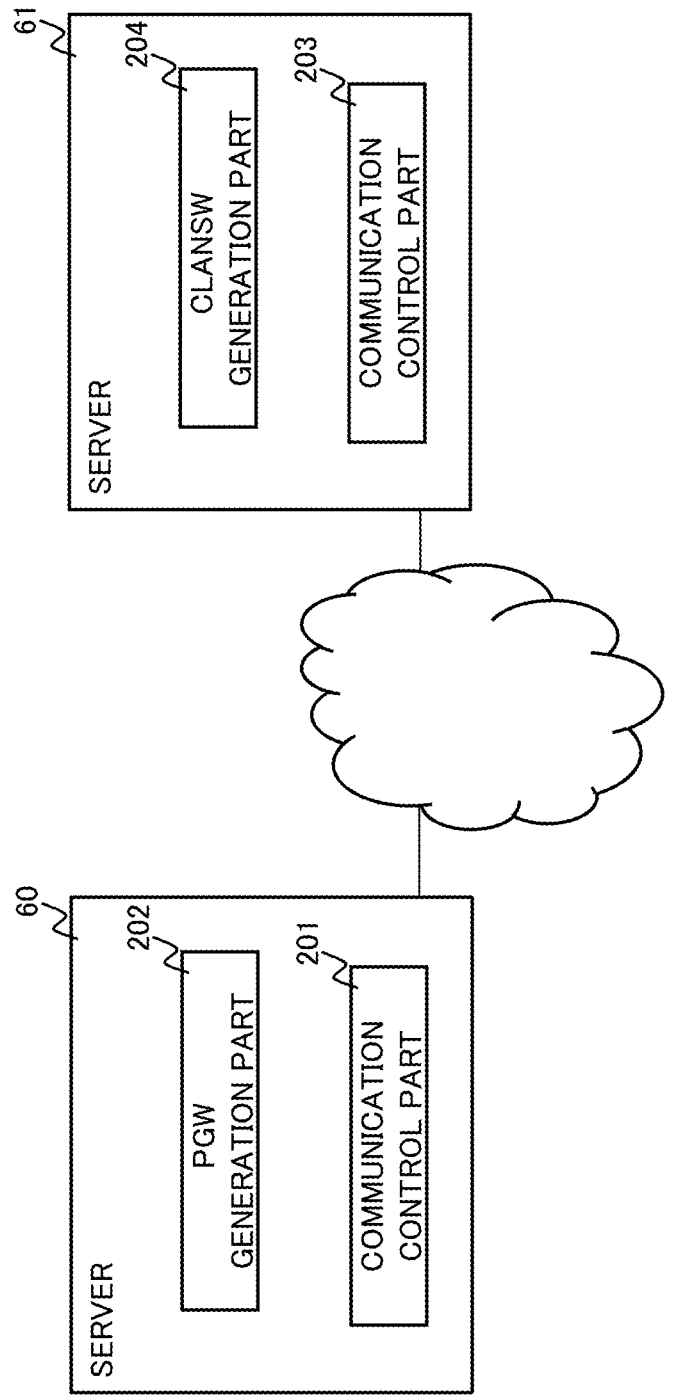
FIG. 14 is a diagram illustrating an example of a configuration of a cloud LAN system and servers.

That is, the cloud LAN system 30 according to the above example embodiments has a configuration as illustrated in FIG. 14. In FIG. 14, a communication control part 201 of a server 60 receives an instruction from the cloud LAN configuration apparatus 32 and a PGW generation part 202 generates the PGW 34. More specifically, the PGW generation part 202 generates a virtual machine for operating the PGW 34 and runs an application realizing functions of the PGW 34 on the virtual machine. Information relating to the generated PGW 34 is returned to the cloud LAN configuration apparatus 32 via the communication control part 201. Similarly, a server 61 communicates with the cloud LAN configuration apparatus 32 with respect to the cloud LAN switch 36 via a communication control part 203, and a CLANSW generation part 204 generates the cloud LAN switch 36.

Figure 15:
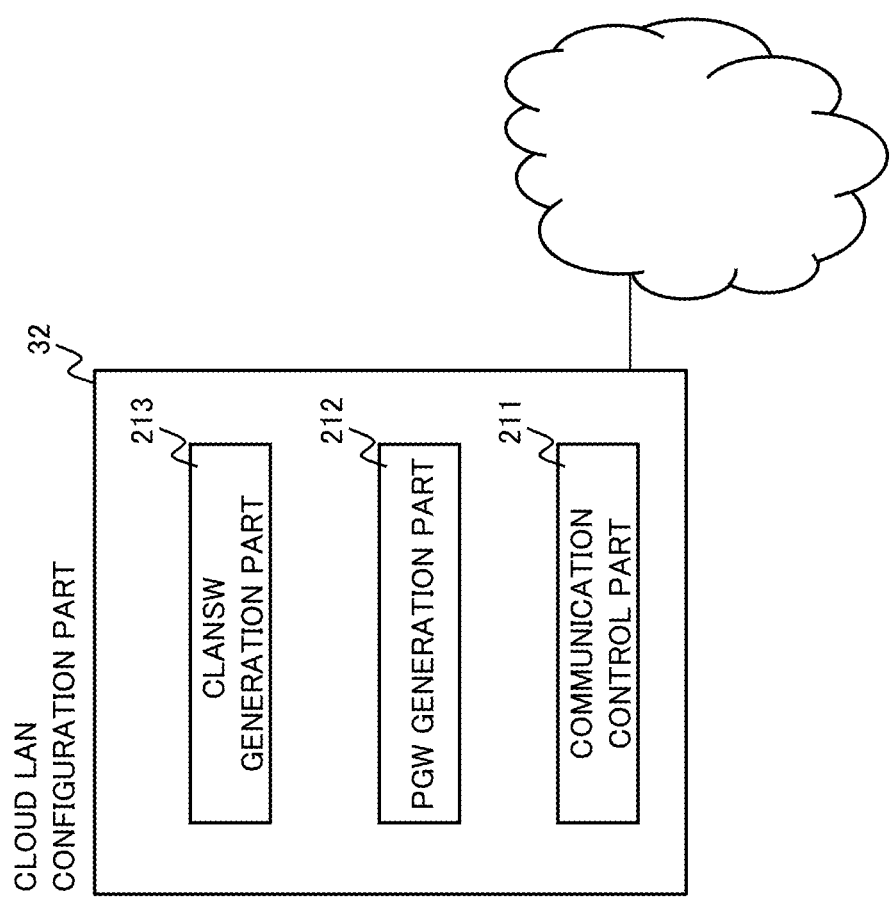
FIG. 15 is a diagram illustrating an example of a configuration of a cloud LAN system and a cloud LAN configuration apparatus.

Instead of generating the PGWs 34 on the servers 60 and 61 on the cloud, the PGWs 34 may be generated within the cloud LAN configuration apparatus 32, as illustrated in FIG. 15. In FIG. 15, a communication control part 211 controls communication with the other apparatuses, and a PGW generation part 212 and a CLANSW generation part 213 generate the PGW 34 and the cloud LAN switch 36, respectively. A module(s) realizing the above described function(s) of the cloud LAN configuration apparatus 32 (e.g., outputting information to the user information management apparatus 33) are omitted in FIG. 15.

A part or all of the above example embodiments can be described as the following Supplementary Notes, but not limited thereto.

[Supplementary Note 1]

As the communication system according to the first aspect.

[Supplementary Note 2]

The communication system preferably according to Supplementary Note 1, wherein the user information management apparatus acquires specific information of the connection terminal via the mobile data transfer network and selects an access point assigned to the connection terminal based on the acquired specific information.

[Supplementary Note 3]

The communication system preferably according to Supplementary Note 1 or 2, wherein the user information management apparatus notifies the connection terminal of the selected access point via a base station connected to the connection terminal.

[Supplementary Note 4]

The communication system preferably according to any one of Supplementary Notes 1 to 3, wherein the network configuration apparatus generates:

a PGW (Packet Data Network Gateway) that serves as an access point between the mobile data transfer network and the cloud LAN; and a cloud LAN switch that switches a packet forwarded in the cloud LAN.

[Supplementary Note 5]

The communication system preferably according to Supplementary Note 4, wherein the PGW receives an encapsulated packet from either the mobile data transfer network or the cloud LAN, extracts a user packet from the received encapsulated packet, converts the extracted user packet to an encapsulated packet suitable for the other network, and transmits the converted packet, and wherein the cloud LAN switch receives an encapsulated packet from either the mobile data transfer network or the cloud LAN, extracts a user packet from the received encapsulated packet, converts the extracted user packet to an encapsulated packet suitable for the other network, and transmits the converted packet.

[Supplementary Note 6]

The communication system preferably according to Supplementary Note 4 or 5, wherein the address management apparatus assigns a network identifier to the connection terminal and generates a terminal management table that associates an identifier of the connection terminal with the network identifier assigned to the connection terminal and an network identifier of an access point assigned to the connection terminal, wherein the PGW creates a transfer table for transferring a received packet from the terminal management table, determines a transfer destination network from the transfer table using a network identifier included in a received packet as a search key, and transmits the packet to the determined network, and wherein the cloud LAN switch creates a transfer table for transferring a received packet from the terminal management table, determines a transfer destination in the cloud LAN from the transfer table using a network identifier included in a received packet as a search key, and transmits the packet to the determined transfer destination.

[Supplementary Note 7]

The communication system preferably according to Supplementary Note 6, wherein the PGW includes:

a decapsulation part that decapsulates an encapsulated packet forwarded in a communication channel of the mobile data transfer network or the cloud LAN when the packet is encapsulated;

a header analysis part that refers to the transfer table using a network identifier extracted from the decapsulated packet as a search key and determines the network identifier of the packet transfer destination; and an encapsulation part that encapsulates the packet adapted to a network of a packet transfer destination using the determined network identifier.

[Supplementary Note 8]

The communication system preferably according to Supplementary Note 6 or 7, wherein the PGW refers to the transfer table using a network identifier corresponding to the destination of an encapsulated packet forwarded from the cloud LAN as a search key and registers the network identifier corresponding to the destination and a network identifier corresponding to a source of the encapsulated packet in association with each other in the transfer table, when the network identifier corresponding to the destination is present in the transfer table.

[Supplementary Note 9]

The communication system preferably according to any one of Supplementary Notes 6 to 8, wherein the terminal management table includes direct access information that specifies an entry to be registered with priority in the transfer table, and the PGW registers with priority an entry given with the direct access information in the transfer table.

[Supplementary Note 10]

As the communication method according to the second aspect.

[Supplementary Note 11]

A program causing a computer to execute processing comprising:

configuring a closed network constructed independently for each user in an open network as a cloud LAN (Local Area Network) and generating an access point for accessing the cloud LAN assigned to each of a plurality of terminals that belong to users using the cloud LAN;

selecting the access point assigned to a connection terminal accessing the cloud LAN via a mobile data transfer network, out of the plurality of terminals, and notifying the connection terminal of the selected access point; and delivering an address for the connection terminal to access the cloud LAN in response to a request from the connection terminal.

The above program can be stored in a computer-readable storage medium. The storage medium may be a non-transient one such as a semiconductor memory, a hard disk, a magnetic recording medium, and an optical recording medium. The present invention can also be realized as a computer program product.

[Supplementary Note 12]

A cloud LAN system in a communication network connecting a cloud data transfer network providing a dedicated virtual communication network to a plurality of users via a mobile data transfer network accommodating mobile terminals, the cloud LAN system including:

a cloud LAN configuration apparatus that sets up an independent LAN for each user within a cloud data transfer network and an access point between the mobile data transfer network and the LAN;

a cloud LAN generated by the cloud LAN configuration apparatus for each user and having an access point to an external communication network;

a user information management apparatus that identifies a user based on specific information of a mobile terminal, selects a cloud LAN to be connected and an access point for data communication between the mobile terminal and the cloud LAN, notifies the mobile terminal or the mobile data transfer network of the selected access point, and sets up, manages, and controls communication between the mobile terminal and the cloud LAN; and a terminal-IP management apparatus that delivers a terminal address in response to a request from the mobile terminal.

[Supplementary Note 13]

The cloud LAN system preferably according to Supplementary Note 12, wherein the cloud LAN is constituted by:

a PGW that serves as an access point between the mobile data transfer network and the cloud LAN;

a cloud LAN switch that transfers data within the cloud LAN; and a cloud data transfer network that connects the PGW and the cloud LAN switch.

[Supplementary Note 14]

The cloud LAN system preferably according to Supplementary Note 13, wherein the PGW extracts a user packet from an encapsulated user data packet received from the mobile data transfer network or the cloud data transfer network, converts the user packet to an encapsulated user packet, and transmits the encapsulated user packet to the mobile data transfer network or the cloud data transfer network.

[Supplementary Note 15]

The cloud LAN system preferably according to Supplementary Note 13, wherein the cloud LAN switch extracts a user packet from an encapsulated user data packet received from the mobile data transfer network or the cloud data transfer network, converts the user packet to an encapsulated user packet, and transmits the encapsulated user packet to the mobile data transfer network or the cloud data transfer network.

[Supplementary Note 16]

A cloud LAN system in a communication network connecting a cloud data communication network providing a dedicated virtual communication network to a mobile data transfer network accommodating mobile terminals and a plurality of users, the cloud LAN system including:

a cloud LAN configuration apparatus that constructs a cloud LAN, which is a LAN dedicated to a user, in a cloud data communication network and sets up an access point between a mobile data transfer network and the cloud LAN dedicated to the user;

a user information management apparatus that receives terminal information of a mobile terminal, identifies a user from specific information of the mobile terminal, determines a cloud LAN access point for the user, and forms a communication channel to transfer a user packet between the mobile terminal in a mobile data transfer network and the cloud LAN access point for the user;

a terminal-IP management apparatus that assigns a network identifier to the mobile terminal and generates a terminal-IP management table associating the mobile terminal with the network identifier and the communication channel based on an instruction from the user information management apparatus;

a packet gateway apparatus that creates a transfer table from the terminal-IP management table notified by the terminal-IP management apparatus, determines a communication channel in the transfer destination mobile data transfer network or the transfer destination cloud data transfer network from the transfer table using the network identifier of a user packet forwarded from a communication channel of the mobile data transfer network and the cloud data transfer network as a search key, and sends the user packet to the determined communication channel; and a cloud LAN switch that creates a transfer table from the terminal-IP management table notified by the terminal-IP management apparatus, determines a transfer destination in the transfer destination cloud data transfer network from the transfer table using the network identifier of a user packet forwarded from the cloud data transfer network as a search key, and sends the user packet.

[Supplementary Note 17]

The cloud LAN system preferably according to Supplementary Note 16, wherein the cloud LAN configuration apparatus constructs an independent access point and an independent closed LAN for each user in a cloud data transfer network in response to a request and manages the access point and the closed LAN.

[Supplementary Note 18]

The cloud LAN system preferably according to Supplementary Note 16 or 17, wherein the mobile terminal information used by the user information management apparatus when connecting to the access point, includes:

a user identifier capable of identifying a user;

mobile terminal location information; and all or some of the mobile terminal attributes.

[Supplementary Note 19]

The cloud LAN system preferably according to any one of Supplementary Notes 16 to 18, wherein the terminal-IP management table includes network identifier information of a mobile terminal, network identifier information within a mobile data transfer network, and network identifier information within a cloud data transfer network, and the network identifier information within the mobile data transfer network for the network identifier of the mobile terminal used in forwarding a user packet is associated with the network identifier information within the cloud data transfer network.

[Supplementary Note 20]

The cloud LAN system preferably according to Supplementary Note 19, wherein the terminal-IP management table includes direct communication capability information, and wherein the network identifier of the mobile terminal used in forwarding a user packet is associated with the direct communication capability information.

[Supplementary Note 21]

The cloud LAN system preferably according to any one of Supplementary Notes 16 to 20, wherein the terminal-IP management apparatus makes the network identifier assigned to the mobile terminal independent for each user.

[Supplementary Note 22]

The cloud LAN system preferably according to any one of Supplementary Notes 16 to 21, wherein the packet gateway apparatus includes:

a decapsulation function that terminates a transfer protocol of an encapsulated packet and extracts a user packet when the user packet is encapsulated to include a network identifier of each transfer protocol in a communication channel of a mobile data transfer network and a cloud data transfer network;

a transfer table management circuit that creates a transfer table based on a terminal-IP management table notified by the terminal-IP management apparatus;

a header analysis function that refers to the transfer table using a destination network identifier of the user packet as a search key to determine a destination network identifier of a destination data transfer network and an output port; and an encapsulation function that performs encapsulation using a transfer protocol including a destination network identifier of the destination data transfer network.

[Supplementary Note 23]

The cloud LAN system preferably according to any one of Supplementary Notes 16 to 21, wherein the packet gateway apparatus includes:

a decapsulation function that terminates a transfer protocol of an encapsulated packet and extracts a user packet when the user packet is encapsulated to include a network identifier of each transfer protocol in a communication channel of a mobile data transfer network and a cloud data transfer network;

a transfer table management circuit that creates a transfer table based on a terminal-IP management table received;

a header analysis function that refers to the transfer table using the destination network identifier of the user packet as a search key to determine a destination network identifier of a destination data transfer network and an output port;

an encapsulation function that performs encapsulation using a transfer protocol including a destination network identifier of the destination data transfer network; and an encapsulation learning function that refers to the transfer table using a destination network identifier of the user packet of an encapsulated packet forwarded from a cloud data transfer network, as a search key to notify the transfer table management circuit of a terminal-IP management table that includes a source network identifier of the user packet and a source network identifier of a packet encapsulating the user packet when a corresponding network identifier is found.

[Supplementary Note 24]

The cloud LAN system preferably according to any one of Supplementary Notes 16 to 23, wherein the network identifier is any one of an IP address, a MAC address, and an MPLS LSP label.

It is noted that modes of Supplementary Notes 10 and 11 can be developed into modes of Supplementary Notes 2 to 9 in the same manner as a mode of Supplementary Note 1.

Note that respective pieces of disclosure of the above cited PTLs, etc., are incorporated herein by reference thereto. Variations and adjustments of the example embodiments and examples are possible within the scope of the disclosure (including the claims) of the present invention and based on the basic technical concept of the present invention. Various combinations and selections of various disclosed elements (including elements in the claims, example embodiments, examples, drawings, etc.) are possible within the scope of the disclosure of the present invention. Namely, the present invention of course includes various variations and modifications that could be made by those skilled in the art according to the overall disclosure including the claims and the technical concept. Regarding a numerical value range(s) described in the present disclosure, it should be deemed that arbitrary numerical values or small ranges included in the ranges should be deemed to have been concretely disclosed even if there is no other description thereof.

The invention claimed is:

1. A communication system comprising:

a network configuration apparatus that configures, as a cloud LAN (Local Area Network), a closed network constructed independently for each of a plurality of users on an open network, and generates an access point for accessing the cloud LAN, the access point being assigned to each of a plurality of terminals that belong to the user using the cloud LAN;

a user information management apparatus that selects the access point assigned to a connection terminal, the connection terminal being a terminal accessing the cloud LAN via a mobile data transfer network, out of the plurality of terminals, and notifies the connection terminal of the access point selected; and an address management apparatus that delivers an address for the connection terminal to access the cloud LAN in response to a request from the connection terminal, wherein the network configuration apparatus generates a PGW (Packet Data Network Gateway) that serves as an access point between the mobile data transfer network and the cloud LAN, and a cloud LAN switch that performs switching of a packet forwarded on the cloud LAN, and wherein each of the PGW and the cloud LAN switch receives a first encapsulated packet from either one of the mobile data transfer network and the cloud LAN, extracts a user packet from the first encapsulated packet received, and converts the user packet extracted to a second encapsulated packet adapted to the other one of the mobile data transfer network and the cloud LAN to transmit the second encapsulated packet thereto.

2. The communication system according to claim 1, wherein the user information management apparatus obtains specific information on the connection terminal via the mobile data transfer network to select the access point assigned to the connection terminal, based on the specific information obtained.

3. The communication system according to claim 1, wherein the user information management apparatus notifies the connection terminal of the access point selected, via a base station connected to the connection terminal.

4. The communication system according to claim 1, wherein the address management apparatus assigns a network identifier to the connection terminal, and generates a terminal management table that associates an identifier of the connection terminal with the network identifier assigned to the connection terminal and a network identifier of the access point assigned to the connection terminal, wherein each of the PGW and the cloud LAN switch creates a transfer table used for transferring a received packet with reference to the terminal management table, determines a transfer destination network with reference to the transfer table, by using a network identifier included in the received packet as a search key, and transmits the received packet to the transfer destination network determined.

5. The communication system according to claim 4, wherein the PGW decapsulates the first encapsulated packet when the packet forwarded in a communication channel of the mobile data transfer network or the cloud LAN is encapsulated;

with reference to the transfer table, by using a network identifier extracted from the decapsulated packet as a search key, determines a network identifier of the packet transfer destination; and encapsulates the packet adapted to the network of the packet transfer destination, by using the identifier determined network.

6. The communication system according to claim 4, wherein the PGW, with reference to the transfer table, by using, as a search key, a network identifier corresponding to a destination of the first encapsulated packet forwarded from the cloud LAN, upon finding that the network identifier corresponding to the destination is present in the transfer table, registers the network identifier corresponding to the destination and a network identifier corresponding to a source of the first encapsulated packet in association with each other in the transfer table.

7. The communication system according to claim 4, wherein the terminal management table includes
direct access information that specifies an entry to be registered with priority in the transfer table, and
wherein the PGW registers with priority an entry with the direct access information attached thereto in the transfer table.

8. A communication method comprising:
configuring, as a cloud LAN (Local Area Network), a closed network constructed independently for each of a plurality of users in an open network, and generating an access point for accessing the cloud LAN, the access point assigned to each of a plurality of terminals that belong to the user using the cloud LAN;
selecting the access point assigned to a connection terminal, the connection terminal being a terminal accessing the cloud LAN via a mobile data transfer network, out of the plurality of terminals, and notifying the connection terminal of the access point selected;
delivering an address for the connection terminal to access the cloud LAN in response to a request from the connection terminal;
generating a PGW (Packet Data Network Gateway) that serves as an access point between the mobile data transfer network and the cloud LAN, and a cloud LAN switch that performs switching of a packet forwarded on the cloud LAN;
receiving, by each of the PGW and the cloud LAN switch, a first encapsulated packet from either one of the mobile data transfer network and the cloud LAN;
extracting, by each of the PGW and the cloud LAN switch, a user packet from the first encapsulated packet received; and
converting, by each of the PGW and the cloud LAN switch, the user packet extracted to a second encapsulated packet adapted to the other one of the mobile data transfer network and the cloud LAN to transmit the second encapsulated packet thereto.

9. The communication system according to claim 4, wherein the PGW serving as the access point assigned to the connection terminal, learns and associates a source address and an encapsulated source address of a user packet transmitted to the connection terminal to reflect association between the source address and the encapsulated source address in the transfer table.

10. The communication method according to claim 8, further comprising:
obtaining specific information on the connection terminal via the mobile data transfer network to select the access point assigned to the connection terminal, based on the specific information obtained.

11. The communication method according to claim 8, further comprising:
notifying the connection terminal of the access point selected, via a base station connected to the connection terminal.

12. The communication method according to claim 8, further comprising:
assigning a network identifier to the connection terminal;
generating a terminal management table that associates an identifier of the connection terminal with the network identifier assigned to the connection terminal and a network identifier of the access point assigned to the connection terminal;
creating, by each of the PGW and the cloud LAN switch, a transfer table used for transferring a received packet with reference to the terminal management table;
determining, by each of the PGW and the cloud LAN switch, a transfer destination network with reference to the transfer table, by using a network identifier included in a received packet as a search key; and
transmitting, by each of the PGW and the cloud LAN switch, the packet to the network transfer destination network determined.

13. The communication method according to claim 12, further comprising:
decapsulating, by the PGW, the first encapsulated packet when the packet forwarded in a communication channel of the mobile data transfer network or the cloud LAN is encapsulated;
referencing, by the PGW, to the transfer table, by using a network identifier extracted from the decapsulated packet as a search key;
determining, by the PGW, a network identifier of the packet transfer destination; and
encapsulating, by the PGW, the packet adapted to the network of the packet transfer destination, by using the identifier determined network.

14. The communication method according to claim 12, further comprising:
referencing, by the PGW, to the transfer table, by using, as a search key, a network identifier corresponding to a destination of the first encapsulated packet from the cloud LAN;
upon finding that the network identifier corresponding to the destination is present in the transfer table; and
registering, by the PGW, the network identifier corresponding to the destination and a network identifier corresponding to a source of the first encapsulated packet in association with each other in the transfer table.

15. The communication system according to claim 12, wherein the terminal management table includes
direct access information that specifies an entry to be registered with priority in the transfer table, wherein the method further comprises:
registering, by the PGW, with priority an entry with the direct access information attached thereto in the transfer table.

16. A non-transitory computer readable medium storing a program causing a computer to execute processing comprising:
configuring, as a cloud LAN (Local Area Network), a closed network constructed independently for each of a plurality of users in an open network, and generating an access point for accessing the cloud LAN, the access point assigned to each of a plurality of terminals that belong to the user using the cloud LAN;
selecting the access point assigned to a connection terminal, the connection terminal being a terminal accessing the cloud LAN via a mobile data transfer network, out of the plurality of terminals and notifying the connection terminal of the access point selected;
delivering an address for the connection terminal to access the cloud LAN in response to a request from the connection terminal;

generating a PGW (Packet Data Network Gateway) that serves as an access point between the mobile data transfer network and the cloud LAN, and a cloud LAN switch that performs switching of a packet forwarded on the cloud LAN;

receiving, by each of the PGW and the cloud LAN switch, a first encapsulated packet from either one of the mobile data transfer network and the cloud LAN;

extracting, by each of the PGW and the cloud LAN switch, a user packet from the first encapsulated packet received; and converting, by each of the PGW and the cloud LAN switch, the user packet extracted to a second encapsulated packet adapted to the other one of the mobile data transfer network and the cloud LAN to transmit the second encapsulated packet thereto.

* * * * *